US012555925B2

(12) United States Patent
Wei et al.

(10) Patent No.: US 12,555,925 B2
(45) Date of Patent: Feb. 17, 2026

(54) FEED STRIPLINE, PHASE SHIFTER, ARRAY ANTENNA, AND BASE STATION

(71) Applicant: Huawei Technologies Co., Ltd., Shenzhen (CN)

(72) Inventors: Xiaodong Wei, Xi'an (CN); Qiqiang Gao, Xi'an (CN); Xinming Liu, Xi'an (CN); Jiejun Zhou, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 253 days.

(21) Appl. No.: 18/343,114

(22) Filed: Jun. 28, 2023

(65) Prior Publication Data

US 2023/0344146 A1 Oct. 26, 2023

Related U.S. Application Data

(63) Continuation of application No. PCT/CN2020/141100, filed on Dec. 29, 2020.

(51) Int. Cl.
*H01Q 21/00* (2006.01)
*H01Q 1/24* (2006.01)
*H01Q 3/32* (2006.01)

(52) U.S. Cl.
CPC ......... *H01Q 21/0075* (2013.01); *H01Q 1/246* (2013.01); *H01Q 3/32* (2013.01)

(58) Field of Classification Search
CPC ....... H01Q 21/0075; H01Q 1/246; H01Q 3/32
See application file for complete search history.

(56) References Cited

U.S. PATENT DOCUMENTS

| | | | | |
|---|---|---|---|---|
| 6,489,859 | B1 * | 12/2002 | Tahara | H01P 5/16 333/120 |
| 8,456,255 | B2 * | 6/2013 | Iluz | H01P 1/184 333/161 |
| 9,391,375 | B1 * | 7/2016 | Bales | H01Q 21/064 |
| 2004/0090286 | A1 * | 5/2004 | Runyon | H01P 5/04 333/117 |
| 2004/0239444 | A1 | 12/2004 | Sledkov | |
| 2010/0171674 | A1 * | 7/2010 | Henderson | H01Q 21/0037 343/778 |
| 2011/0316644 | A1 | 12/2011 | Tsai et al. | |

FOREIGN PATENT DOCUMENTS

| | | |
|---|---|---|
| CN | 205303671 U | 6/2016 |
| CN | 207559068 U | 6/2018 |
| CN | 207852927 U | 9/2018 |

(Continued)

*Primary Examiner* — Hai V Tran
(74) *Attorney, Agent, or Firm* — Slater Matsil, LLP

(57) ABSTRACT

In accordance with an embodiment, a feed stripline includes: a signal input line; a first power branch line; and a second power branch line. A first end of the signal input line is configured to be conductively coupled to an external signal source, a second end of the signal input line is electrically connected to each of the first power branch line and the second power branch line, the first power branch line includes a jump structure, the first power branch line spans from a first side of the second power branch line to a second other side of the second power branch line via the jump structure, and the jump structure and the second power branch line are spaced apart from each other.

20 Claims, 20 Drawing Sheets

(56) References Cited

FOREIGN PATENT DOCUMENTS

| | | | |
|---|---|---|---|
| CN | 109755696 | A | 5/2019 |
| CN | 110380168 | A | 10/2019 |
| CN | 210430115 | U | 4/2020 |
| JP | H0244401 | U | 3/1990 |
| JP | 2002261503 | A | 9/2002 |
| JP | 2007013531 | A | 1/2007 |
| JP | 2012114697 | A | 6/2012 |

* cited by examiner

FEED STRIPLINE, PHASE SHIFTER, ARRAY ANTENNA, AND BASE STATION

CROSS-REFERENCE TO RELATED APPLICATIONS

This application is a continuation of International Application No. PCT/CN2020/141100, filed on Dec. 29, 2020, the disclosure of which is hereby incorporated by reference in its entirety.

TECHNICAL FIELD

This application relates to the field of wireless communication, and in particular, to a feed stripline, a phase shifter on which the feed stripline is disposed, an array antenna, and a base station.

BACKGROUND

A feed stripline is a common component in a communication base station, and may serve as a radio frequency functional device such as a power divider, a coupler, a filter, and an electronic tilt, to implement transmission of a wireless microwave signal. Most existing feed striplines are of a plane structure. To ensure electrical performance, power divider branch lines in the feed stripline extend along different transmission paths in a plane, and avoid signal serial connection caused by crossing or overlapping. Consequently, a plane area of the feed stripline is difficult to control, and a part of the plane area may not be utilized. As a result, an area ratio of the feed stripline is large, which is not conducive to a miniaturization trend of current communication devices such as a base station.

SUMMARY

The present disclosure provides a three-dimensional feed stripline structure, a phase shifter including the three-dimensional feed stripline structure, an array antenna, and a base station, to reduce an area ratio of a feed stripline. This application specifically includes the following technical solutions:

According to a first aspect, this application provides a feed stripline. The feed stripline includes a signal input line, a first power branch line, and a second power branch line, where one end of the signal input line is conducted to an external signal source, the other end is electrically connected to each of the first power branch line and the second power branch line, the first power branch line includes a jump structure, the first power branch line spans from one side of the second power branch line to the other side of the second power branch line by using the jump structure, and the jump structure and the second power branch line are spaced from each other.

In the feed stripline in this application, the first power branch line and the second power branch line are separately connected to the signal input line, so that an external electrical signal input from the signal input line may be separately transferred to the first power branch line and the second power branch line, and the electrical signal is separately transmitted on an extension path of the first power branch line and transmitted on an extension path of the second power branch line. By setting extension lengths of the first power branch line and the second power branch line to be different from each other, a phase difference may be generated between an electrical signal output by the first power branch line and an electrical signal output by the second power branch line, and a preset tilt is correspondingly obtained.

In this application, in the feed stripline, the jump structure is further disposed on the first power branch line, allowing the first power branch line to extend a specific distance on one side of the second power branch line, and also span to the other side of the second power branch line using the jump structure for further extension. The jump structure and the second power branch line are spaced from each other. To be specific, when the first power branch line spans from one side of the second power branch line to the other side, the first power branch line does not overlap the second power branch line. This ensures normal transmission of the electrical signal on each of the first power branch line and the second power branch line. In addition, the jump structure extends an extension range of the first power branch line, improving utilization of a space area of the feed stripline, reducing an overall volume of the feed stripline, and ensuring an electrical function of the feed stripline.

In a possible implementation, the signal input line and the second power branch line are both located in a first plane, the first power branch line includes a first segment and a second segment that are located in the first plane, the first segment and the second segment are distributed on two opposite sides of the second power branch line, the jump structure includes a connection segment located in a second plane, and the connection segment is electrically connected to each of the first segment and the second segment.

In this implementation, the first power branch line is divided into the first segment and the second segment that are independent of each other, and the first segment and the second segment are distributed on the two opposite sides of the second power branch line, so that a main structure of the first power branch line, the signal input line, and the second power branch line are all located in the first plane. This defines a plane structure of a main body of the feed stripline in this application, and facilitates synchronous manufacturing of the first segment, the second segment, the signal input line, and the second power branch line. The connection segment located in the second plane separately collaborates with the first segment and the second segment to implement electrical signal transmission between the first segment and the second segment. This can ensure electrical signal transmission on the first power branch line under a condition that the jump structure and the second power branch line are spaced from each other.

In a possible implementation, the jump structure further includes a first pin and a second pin, the first pin and the second pin are distributed at two opposite ends of the connection segment, the connection segment is in contact with and conducted to the first segment through the first pin, and the connection segment is further in contact with and conducted to the second segment through the second pin.

In this implementation, the jump structure further includes the first pin and the second pin that are distributed at the two opposite ends of the connection segment, and the first pin and the second pin are respectively connected between the first plane and the second plane, so that the two opposite ends of the connection segment are respectively in contact with and conducted to the first segment and the second segment. The electrical signal transmitted in the first segment is finally transmitted to the second segment sequentially through the first pin, the connection segment, and the second pin, and continues to be transmitted to an endpoint of the first power branch line through the second segment.

In a possible implementation, the first pin, the second pin, and the connection segment are of an integrated structure.

In this implementation, the jump structure is integrally formed, and connections between the connection segment and the first pin and the second pin are more stable. This improves reliability of the first power branch line.

In a possible implementation, the first pin and the first segment are welded and fastened, and the second pin and the second segment are also welded and fastened.

In this implementation, through welding and fastening, reliable contact and conduction between the first pin and the first segment can be ensured, and reliable contact and conduction between the second pin and the second segment can be ensured.

In a possible implementation, the first segment includes a first end far away from the signal input line, the second segment includes a second end close to the first segment, a first opening and a second opening are respectively disposed on the first end and the second end, the first pin extends into the first opening and is in contact with and conducted to the first segment, and the second pin extends into the second opening and is in contact with and conducted to the second segment.

In this implementation, the first opening is disposed at a position of the first segment close to the second segment, so that the first pin extends into the first opening; and the second opening is disposed at a position of the second segment close to the first segment, so that the second pin also extends into the second opening. This can ensure reliable contact between the first pin and the first segment, and ensure reliable contact between the second pin and the second segment.

In a possible implementation, the jump structure is elastic; and when the jump structure separately extends into the first opening and the second opening, elastic deformation is formed between the first pin and the second pin, and there is an elastic force of drawing together or stretching apart.

In this implementation, in addition to welding and conduction, reliable overlap contact between the first pin and the first opening may be ensured through elastic deformation. In addition to welding and conduction, reliable overlap contact between the second pin and the second opening may be ensured through elastic deformation. In addition, there is the elastic force, of drawing together or stretching apart, between the first pin and the second pin, so that the elastic force of the first pin and the elastic force of the second pin interact with each other, to ensure reliable overlap contact between the first pin and the second pin and the first opening and the second opening.

In a possible implementation, the connection segment includes a first coupling end and a second coupling end that are opposite to each other, a projection of the first coupling end in the first plane at least partially overlaps the first segment, and the first coupling end is electrically connected to the first segment through coupling; and a projection of the second coupling end in the first plane at least partially overlaps the second segment, and the second coupling end is also electrically connected to the second segment through coupling.

In this implementation, the connection segment is not in contact with the first segment and the second segment, but separately forms a mutual coupling structure with the first segment and the second segment through the first coupling end and the second coupling end. The electrical signal transmitted in the first segment is transmitted to the jump structure through coupling, and then is transmitted to the second segment again through coupling, so that the jump structure transmits the electrical signal in the first segment to the second segment.

In an implementation, a first coupling capacitor is formed between the first coupling end and the first segment, and a second coupling capacitor is formed between the second coupling end and the second segment.

In this implementation, a capacitor structure is separately formed between the jump structure and the first segment and the second segment, and a coupling electrical connection is implemented in a form of the first coupling capacitor and the second coupling capacitor.

In a possible implementation, an insulated isolation pad is separately filled between the first coupling end and the first segment and between the second coupling end and the second segment.

In this implementation, the isolation pad may be formed through injection molding or the like, to form fastening between the first coupling end and the first segment, and form fastening between the second coupling end and the second segment. The isolation pad can ensure relative positions between the jump structure and the first segment and the second segment, to ensure electrical stability of the first coupling capacitor and the second coupling capacitor.

In a possible implementation, the feed stripline includes a printed circuit board, the printed circuit board includes a first metal surface and a second metal surface that are disposed opposite to each other, the first metal surface is constructed as the first plane, and the second metal surface is constructed as the second plane.

In this implementation, the feed stripline is prepared on the printed circuit board to form a form of a PCB (printed circuit board) stripline. The PCB has the first metal surface and the second metal surface that are disposed opposite to each other. The first metal surface is constructed as the first plane of the feed stripline. The signal input line, the first segment, the second segment, and the second power branch line may be disposed in the first metal surface, and the connection segment of the jump structure may be disposed in the second metal surface. In this case, the second metal surface is constructed as the second plane, and a PCB substrate may form reliable support for the feed stripline.

In a possible implementation, the printed circuit board includes a via, the via is connected between the first plane and the second plane, and the first pin and the second pin are both constructed as conductive elements that pass through the via.

In this implementation, the via may be manufactured on the printed circuit board by using existing process technologies. The via is connected between the first plane and the second plane. In addition, a position of the via is disposed, so that the via may be located between the connection segment and the first segment, and located between the connection segment and the second segment. Then, the first pin and the second pin are disposed to be respectively connected between the connection segment and the first segment and connected between the connection segment and the second segment through the via, so that the jump structure can reliably overlap each of the first segment and the second segment.

In a possible implementation, the first pin and the second pin are respectively constructed as conductive materials filled in the via; or the first pin and the second pin separately pass through the via and are fixedly connected to the first segment and the second segment respectively.

In this implementation, the via is filled with metal or another conductive material, to form a conductive via. This implements functions of the first pin and the second pin, and ensures that the connection segment reliably overlaps each of the first segment and the second segment. Alternatively, the first pin and the second pin may be respectively constructed as conductive elements. After passing through the via, the conductive elements overlap the connection segment and the first segment, and are connected between the connection segment and the second segment, to implement an electrical signal transmission function of the jump structure between the first segment and the second segment.

In a possible implementation, an input match line, a first power match line, and a second power match line are further disposed in the second metal surface;

the input match line extends parallel to the signal input line, the first power match line extends parallel to the first power branch line, and the connection segment is constructed as a part of the first power match line; and the second power match line includes a third segment and a fourth segment, the third segment is located on one side of the connection segment and extends parallel to the second power branch line, and the fourth segment is located on the other side of the connection segment and also extends parallel to the second power branch line.

In this implementation, in a second external surface that is disposed opposite to a first external surface, an input match line is further disposed for the signal input line, and the input match line and the signal input line work together and transmit an electrical signal transmitted from the signal source. In addition, the first power match line and the second power match line are also respectively disposed for the first power branch line and the second power branch line. The first power branch line and the first power match line work together to implement transmission of the electrical signal in an extension direction of the first power branch line, and the second power branch line and the second power match line work together to implement transmission of the electrical signal in an extension direction of the second power branch line. Due to a feature of isolation between the first external surface and the second external surface on the PCB, positions of lines in the two external surfaces are relatively fastened, and a basis for implementing signal conduction through cooperation is available.

It may be understood that when the first power match line is disposed in the second external surface, the connection segment may be constructed as a part of the first power match line, and is also configured to implement transmission of the electrical signal between the first segment and the second segment and transmission of the electrical signal in the first power match line.

In a possible implementation, the via on the printed circuit board may alternatively be located between the signal input line and the input match line, and/or between the first power branch line and the first power match line, and/or between the second power branch line and the second power match line, and is configured to: form an electrical path between each line and a match line corresponding to the line, and adjust an equivalent dielectric constant.

In a possible implementation, an included angle $\alpha$ between the projection of the connection segment in the first plane and the second power branch line meets a condition: $45° \le \alpha \le 90°$.

In this implementation, because the connection segment spans the second power branch line and is disposed at an interval with the second power branch line, that is, the connection segment and the second power branch line form a spatial cross, the projection of the connection segment in the first plane partially overlaps the second power branch line. The included angle between the connection segment and the second power branch line is set, so that an overlapping area between the connection segment and the second power branch line can be controlled, thereby avoiding electrical signal interference caused by an excessively large overlapping area between the connection segment and the second power branch line.

In a possible implementation, the first plane is parallel to the second plane.

In this implementation, the first plane is a plane in which the second power branch line is located, and the second plane is a plane in which the connection segment is located. The first plane is set to be parallel to the second plane, so that in a process of spanning the second power branch line, the connection segment always maintains a stable height difference with the second power branch line. This helps control signal interference between the connection segment and the second power branch line.

In a possible implementation, the feed stripline further includes a signal input port, a first output port, and a second output port, one end of the signal input line away from the first power branch line and the second power branch line is connected to the signal input port, one end of the first power branch line away from the signal input line is connected to the first output port, and one end of the second power branch line away from the signal input line is connected to the second output port.

In this implementation, the signal input line is connected to the signal input port to receive the signal source. The first power branch line and the second power branch line separately output signals to the endpoint through signal output ports respectively connected to the first power branch line and the second power branch line, to implement a phase allocation function of the feed stripline.

In a possible implementation, the feed stripline further includes a shielding cavity, and the input line, the first power branch line, and the second power branch line are all accommodated and fastened in the shielding cavity, and are insulated from the shielding cavity.

In this implementation, the feed stripline is constructed as a suspended stripline, and the shielding cavity can shield external signal interference, to reduce a loss of an electrical signal transmitted by the feed stripline in the shielding cavity in this application.

According to a second aspect, this application provides a phase shifter. The phase shifter includes a sliding medium and the feed stripline provided in the first aspect of this application. The sliding medium separately overlaps the first power branch line and/or the second power branch line, and the sliding medium slides relative to the first power branch line and/or the second power branch line to adjust a phase of a signal output by the phase shifter.

According to the second aspect of this application, the feed stripline is used as a power divider in the phase shifter, and the sliding medium may change electrical lengths of the first power branch line and the second power branch line by sliding relative to the feed stripline, to adjust a phase difference between an electrical signal transmitted in the first power branch line and an electrical signal transmitted in the second power branch line.

According to a third aspect, this application provides an array antenna. The array antenna includes the feed stripline provided in the first aspect of this application and/or the phase shifter provided in the second aspect of this application.

According to a fourth aspect, this application further provides a base station. The base station includes the feed stripline provided in the first aspect of this application, and/or the phase shifter provided in the second aspect of this application, and/or the array antenna provided in the third aspect of this application.

In a possible implementation, the base station further includes a building baseband processing unit, a remote radio unit, and an antenna feed system. The feed stripline provided in the first aspect of this application, and/or the phase shifter provided in the second aspect of this application, and/or the array antenna provided in the third aspect of this application are/is disposed in the antenna feed system. The remote radio unit is connected between the building baseband processing unit and the antenna feed system. The antenna feed system is connected to the building baseband processing unit through the remote radio unit to implement a transceiver function of a wireless signal.

It may be learned that, in the phase shifter, the array antenna, and the base station provided in the second aspect to the fourth aspect of this application, because the feed stripline in this application is used, the same as the feed stripline in the first aspect of this application, the first power branch line may be distributed on two sides of the second power branch line, improving plane utilization of the feed stripline, making a volume ratio of the feed stripline smaller, and facilitating overall volume control of products in various aspects.

DETAILED DESCRIPTION OF ILLUSTRATIVE EMBODIMENTS

The following describes technical solutions in embodiments of this application with reference to accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

Figure 1:
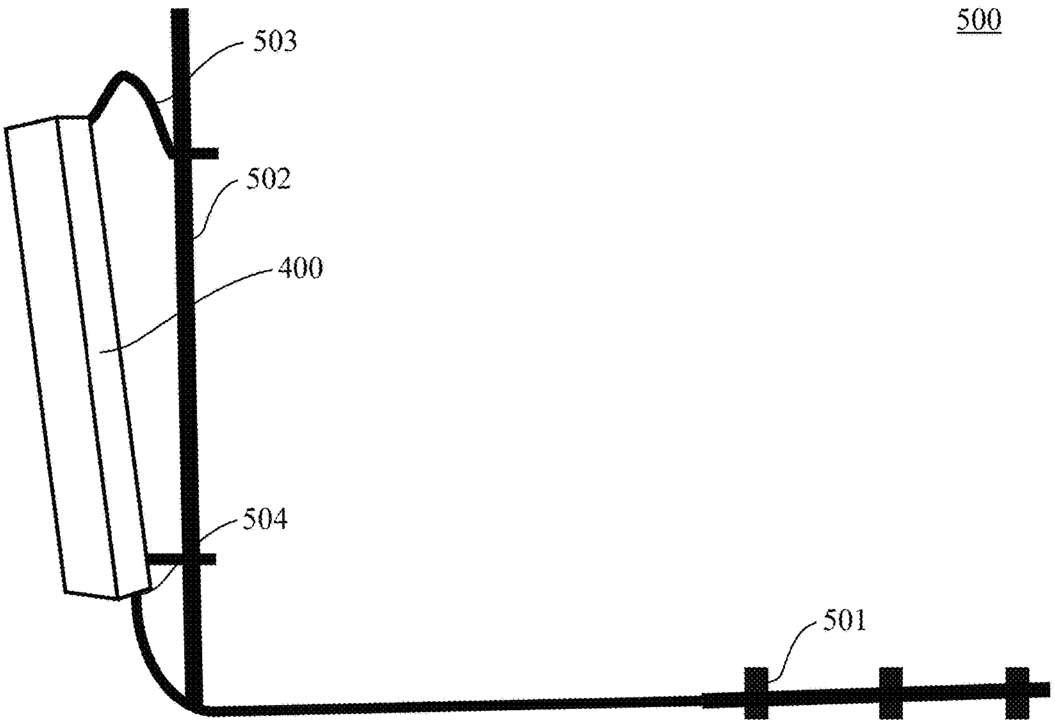
FIG. 1 is a schematic diagram of an antenna feed system in a base station according to an embodiment of this application.

A base station in this application includes a building baseband processing unit (BBU), a remote radio unit (RRU), and an antenna feed system 500 shown in FIG. 1. The remote radio unit is connected between the building baseband processing unit and the antenna feed system 500. There may be a plurality of antenna feed systems 500, and there may also be a plurality of remote radio units of a same quantity as the antenna feed systems 500. Each antenna feed system 500 cooperates with one remote radio unit, and the plurality of antenna feed systems 500 each are connected to one building baseband processing unit through a corresponding remote radio unit, to implement functions of receiving and sending radio signals.

Refer to a schematic diagram of a structure of the antenna feed system 500 shown in FIG. 1. The antenna feed system 500 includes an array antenna 400, a pole 502, an antenna support 503, a connector seal element 504, and a grounding apparatus 501. The pole 502 is fastened relative to the ground. The antenna support 503 is connected between the array antenna 400 and the pole 502, to implement a fasten connection between the array antenna 400 and the pole 502. In some embodiments, the antenna support 503 may be further disposed as an adjustable support, to adjust an orientation and an angle of the array antenna 400 relative to the pole 502, to cooperate with a signal transmission angle of the array antenna 400, and ensure that there is a preset tilt formed between a signal sent by the antenna feed system 500 and the ground. The base station in this application may be disposed in any public place or cell, to implement a signal coverage function in an area corresponding to the base station.

The array antenna 400 is an array antenna in this application. The array antenna 400 is further electrically connected to the grounding apparatus 501, to implement a grounding function of the array antenna 400. One end of the grounding apparatus 501 that is far away from the array antenna 400 may be further connected and fastened to the pole 502, to implement a grounding function through the pole 502. It may be understood that the grounding apparatus 501 may alternatively be directly fastened on the ground, to ensure a reliable grounding function of the array antenna 400. The array antenna 400 is usually accommodated in a sealed box body (radome). In terms of mechanical performance, the box body needs to have sufficient stiffness and strength and capabilities such as anti-fouling and waterproofing, to protect internal components of the array antenna 400 from external environment. In terms of electrical performance, the box body needs to have a good electromagnetic wave penetration characteristic, to ensure signal receiving and sending functions of the array antenna 400. The connector seal element 504 may be further disposed between the grounding apparatus 501 and the box body of the array antenna 400. When the grounding apparatus 501 is led out from the array antenna 400, the connector seal element 504 can be used to implement a sealing connection between the grounding apparatus 501 and the box body of the array antenna 400, to further implement sealing protection for components inside the box body of the array antenna 400.

Figure 2:
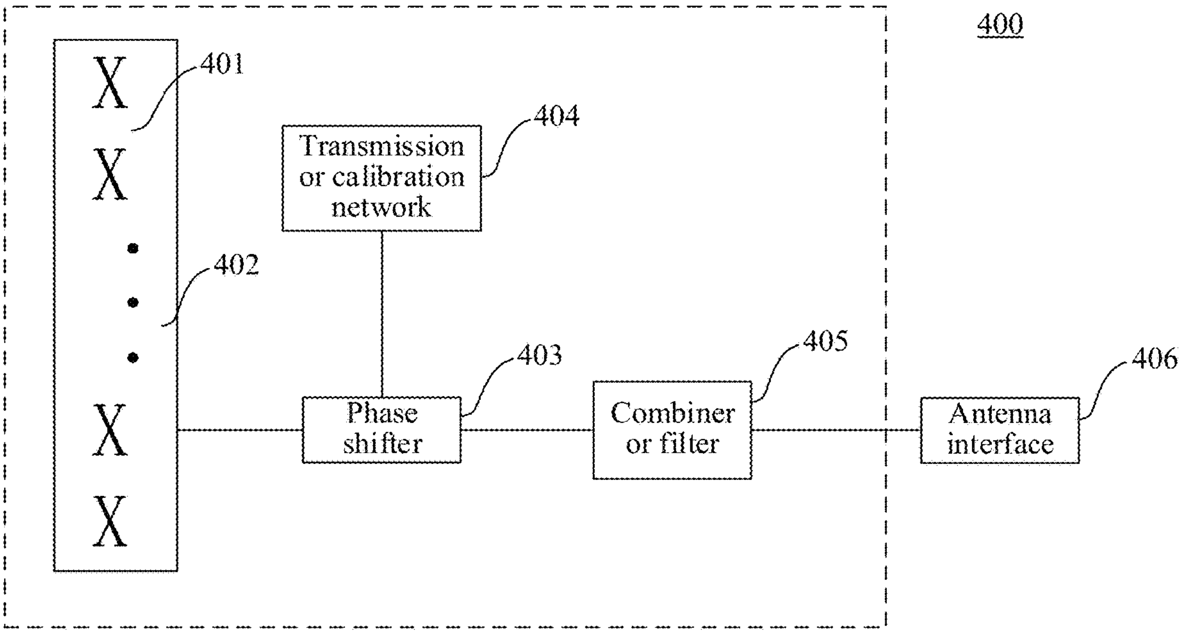
FIG. 2 is a schematic diagram of an internal architecture of an array antenna in an antenna feed system according to FIG. 1.

Refer to a diagram of an internal architecture of the array antenna 400 in this application shown in FIG. 2. Radiation units 401, a metal reflection panel 402, and a phase shifter 403 are disposed inside the box body of the array antenna 400 in this application. The radiation units 401 are located on one side of the metal reflection panel 402, and forms at least one independent radiation array with the metal reflection panel 402. The radiation units 401 are antenna elements, configured to transmit or receive radio waves. Frequencies of a plurality of radiation units 401 in an independent radiation array may be the same or may be different, to correspond to radio wave receiving and sending in different frequency bands. When the metal reflection panel 402 is located on one side of the radiation units 402, the metal reflection panel 402 may reflect radio signals, and enable the radio signals to be aggregated on the radiation units 401, to enhance the radio signals received by the radiation units 401. The metal reflection panel 402 is further configured to reflect radio signals at the radiation units 401 and transmit the radio signals to the outside, to enhance strength of the signals sent by the radiation units 401. Further, the metal reflection panel 402 is further configured to block or shield radio signals from the other side (that is, a reverse direction) of the radiation units 401, to avoid interference from the radio signals from the other side to the radiation units 401.

It may be understood that the phase shifter 403 in the array antenna 400 is a phase shifter in this application. The phase shifter 403 is electrically connected to the radiation units 401, and one side of the phase shifter 403 that is away from the radiation units 401 is further connected to an antenna interface 406, and is connected to the building baseband processing unit (not shown in the figure) of the base station through the antenna interface 406. The building baseband processing unit of the base station may be configured to generate signals. After phase allocation is performed on the signals by the phase shifter 403, the signals are transferred to the radiation units 401, and transmitted to the outside. Alternatively, the building baseband processing unit is configured to receive radio signals transmitted by the radiation units 401, and the radio signals are obtained through phase processing performed by the phase shifter 403. The phase shifter 403 in this application is configured to perform phase adjustment on a radio signal, to change a tilt of a radio signal beam, and optimize a communication network. Further, functional components such as a transmission or calibration network 404 and a combiner or filter 405 may be further disposed in the array antenna 400, and are separately configured to perform operations such as calibrating a radio signal and adjusting an amplitude of the radio signal.

Figure 3:
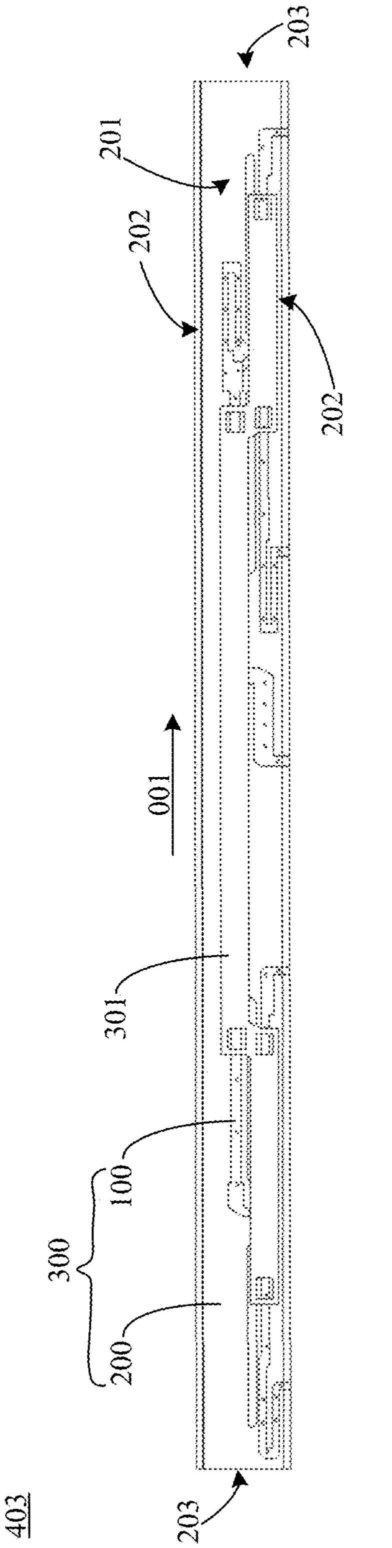
FIG. 3 is a schematic diagram of a structure of a phase shifter in an array antenna according to FIG. 2.

Refer to a schematic diagram of a structure of the phase shifter 403 in this application shown in FIG. 3. The phase shifter 403 may include a feed stripline 100 and a sliding medium 301. The sliding medium 301 may slide relative to the feed stripline 100, to adjust a phase of the phase shifter 403 by changing an electrical length of the feed stripline 100. In the phase shifter 403 in this application, the feed stripline 100 may be configured to implement functions of a power divider. In other words, the sliding medium 301 slides relative to the power divider formed by the feed stripline 100, to change a phase output of the phase shifter 403. It may be understood that, in some other embodiments, the feed stripline 100 provided in this application may be further used as a coupler, an electronic tilt, a filter, or the like, and is used in the base station in this application, to implement functions such as microwave radio signal transmission and/or phase adjustment.

In this specification of this application, for ease of description of embodiments, the feed stripline 100 is used as a power divider in the phase shifter 403 to describe implementations in detail. Further, in this application, the feed stripline 100 is further disposed in a shielding cavity, to form a structure of a suspended stripline 300.

Figure 4:
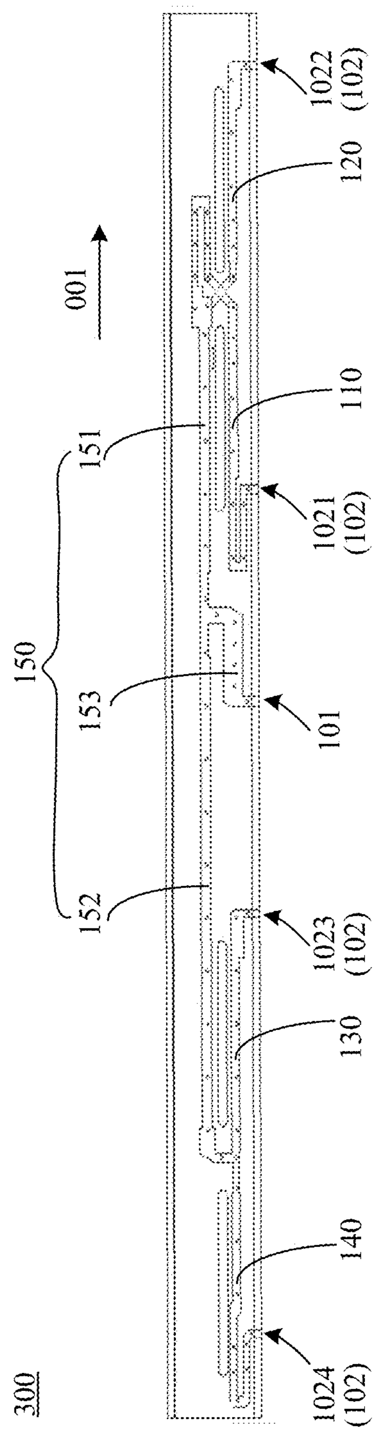
FIG. 4 is a schematic diagram of a structure of a feed stripline in a phase shifter according to FIG. 3.

Still refer to FIG. 3 and a schematic diagram of the suspended stripline 300 in this application shown in FIG. 4. The suspended stripline 300 includes the cavity 200 and the feed stripline 100. The feed stripline 100 is located in the cavity 200 and is fastened relative to the cavity 200. The feed stripline 100 is further insulatively connected to the cavity 200. In some embodiments, a ¼ wavelength lightning protection short-circuit line for protection may be further disposed between the feed stripline 100 and the cavity 200. In an embodiment, the feed stripline 100 is integrally accommodated in the cavity 200. In addition, it can be learned from FIG. 4 that the feed stripline 100 mainly extends in the cavity 200 along a first direction 001, where the first direction 001 may be defined as a main extension direction of the feed stripline 100.

The cavity 200 has electromagnetic shielding performance, and may be used as a grounding structure of the feed stripline 100. In addition, the cavity 200 shields external signal interference, to ensure electrical signal transmission of the feed stripline 100. In other words, the cavity 200 is used as a shielding cavity of the feed stripline 100. In an embodiment, the cavity 200 may be an integrally sealed structure, and the stripline 100 is accommodated in the integrally sealed cavity 200, to achieve a better shielding effect. In some other embodiments, a via 204 may be disposed in the cavity 200 as shown in FIG. 3 and FIG. 4. Specifically, in the cavity 200 shown in FIG. 3 and FIG. 4, the cavity 200 has an upper surface (not shown in the figure) and a lower surface 201 that are oppositely disposed to each other, and a side surface 202 connected between the upper surface and the lower surface 201. There are two side surfaces 202, and the two side surfaces 202 are also disposed on two opposite sides of the stripline 100. The upper surface, the lower surface 201, and the two side surfaces 202 all extend along the first direction 001, and in a length extension direction (the first direction 001) of the feed stripline 100, the cavity 200 is a structure provided with a via 203. In other words, the cavity 200 forms a through structure in the length extension direction (the first direction 001) of the feed stripline 100, and the via 203 penetrates the cavity 200 along the first direction 001. The cavities 200 of the two structures both can implement a reliable shielding effect for the feed stripline 100. In addition, the cavity 200 provided with the via 203 is further convenient to be manufactured by using molding processes such as extrusion and casting, and also facilitate assembly of the feed stripline 100 in the cavity 200.

The sliding medium 301 is slidely connected in the cavity 200, and is located on one side of the feed stripline 100. As shown in FIG. 3 and FIG. 4, the sliding medium 301 is located above the feed stripline 100 in a vertical direction. The sliding medium 301 may slide relative to the cavity 200, and adjust a position of the sliding medium 301 relative to the feed stripline 100. A different position of the sliding medium 301 relative to the feed stripline 100 causes an equivalent dielectric constant of the feed stripline 100 to change accordingly. In other words, sliding of the sliding medium 301 relative to the feed stripline 100 may change the electrical length of the feed stripline 100, and further change the phase output of the feed stripline 100. In an embodiment, the sliding medium 301 slides relative to the feed stripline 100 along the extension direction (the first direction 001) of the feed stripline 100, to achieve a phase shift effect in a larger range for the feed stripline 100.

Still refer to FIG. 4. The feed stripline 100 includes a signal input line 150 and at least two power branch lines. As shown in FIG. 4, the at least two power branch lines include four power branch lines: a first power branch line 110, a second power branch line 120, a third power branch line 130, and a fourth power branch line 140. The feed stripline 100 further includes a signal input port 101 and a signal output port 102. There are also a plurality of signal output ports 102, and each power branch line is connected to one signal output port 102. As shown in FIG. 4, the first power branch line 110 is connected to a first signal output port 1021, the second power branch line 120 is connected to a second signal output port 1022, the third power branch line 130 is connected to a third signal output port 1023, and the fourth power branch line 140 is connected to a fourth signal output port 1024.

One end of the signal input line 150 is connected to the signal input port 101. The signal input line 150 receives or sends a signal through the signal input port 101. In this embodiment of this application, the signal input port 101 and the signal output port 102 may be independent interface structures. The signal input port 101 may also be defined as one end of the signal input line 150, and the signal output port 102 may also be defined as one end of the power branch line. It may be understood that, notches (not shown in the figure) corresponding to the signal input port 101 and the signal output port 102 may be further disposed on the cavity 200, to implement signal transmission between the feed stripline and the outside.

One end of the signal input line 150 that is far away from the signal input port 101 is conducted to a plurality of power branch lines. As shown in FIG. 4, the end of the signal input line 150 that is far away from the signal input port 101 is conducted to the first power branch line 110, the second power branch line 120, the third power branch line 130, and the fourth power branch line 140. In addition to a main body 153 connected to the signal input port 101, the signal input line 150 further includes a first input segment 151 and a second input segment 152 that are separately connected to the main body 153. One side of the main body 153 that is far away from the signal input port 101 is first connected to the first input segment 151 and the second input segment 152. After the first input segment 151 and the second input segment 152 separately extend in different directions, one end of the first input segment 151 that is far away from the signal input port 101 is connected to the first power branch line 110 and the second power branch line 120, and one end of the second input segment 152 that is far away from the signal input port 101 is connected to the third power branch line 130 and the fourth power branch line 140. In this way, electrical signals input from the signal input port 101 may enter the feed stripline 100 from the main body 153, and then be transferred to the power branch lines through the first input segment 151 and the second input segment 152.

It should be noted that the first input segment 151 and the second input segment 152 are used as connection lines connecting the main body 153 and the power branch lines, and may also be considered as a part of the power branch lines. In other words, the first input segment 151 may also be considered as a line extending to the main body 153 after the first power branch line 110 and the second power branch line 120 are combined, and the second input segment 152 may also be considered as a line extending to the main body 153 after the third power branch line 130 and the fourth power branch line 140 are combined. The first input segment 151 and the second input segment 152 are merely used as two connection segment structures in the feed stripline 100. Specific homing division of the first input segment 151 and the second input segment 152 does not affect function implementation of the feed stripline 100 in this application.

It may be understood that, when the feed stripline 100 includes four power branch lines, if the four power branch lines are directly conducted to the signal input line 150, in other words, if the four power branch lines are directly connected to the main body 153 of the signal input line 150, when electrical signals flow from the main body 153 to the power branch lines, a phenomenon that the electrical signals flow from a large line width to a narrow line width occurs, which is not conducive to impedance matching of the feed stripline 100. The first input segment 151 and the second input segment 152 may be disposed to provide transition for a line width change on a transmission path of the electrical signals, to reduce a loss caused by the line width change in a transmission process of the electrical signals.

In another aspect, in the feed stripline 100 in this application, it is not limited to disposition of two input segments: the first input segment 151 and the second input segment 152. When the feed stripline 100 includes more than four power branch lines, more input segments may be further disposed to be connected to different power branch lines.

Figure 5A:
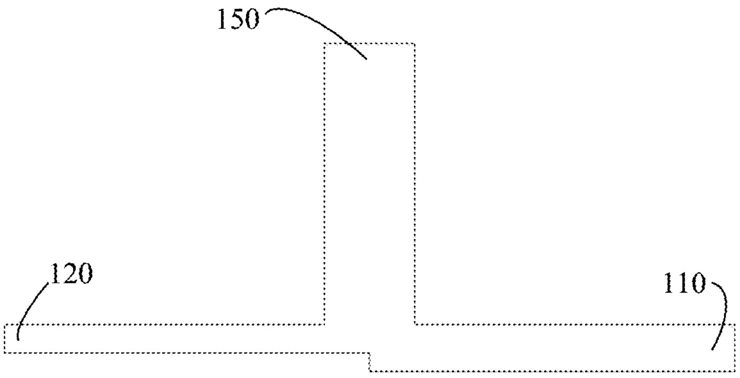
FIG. 5*a*, FIG. 5*b*, and FIG. 5*c* are schematic diagrams of structures of different power divider forms in a feed stripline according to FIG. 4.
Figure 5B:
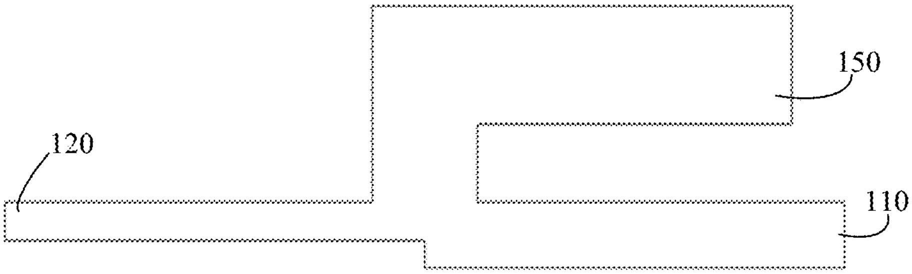
Figure 5C:
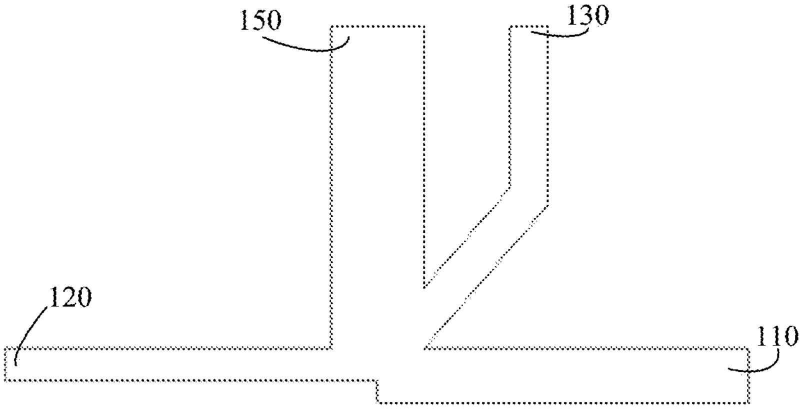

Alternatively, when there are two or three power branch lines of the feed stripline 100, an input segment transition structure may not be disposed, and the first power branch line 110 and the second power branch line 120 are directly connected to the signal input line 150 (as shown in FIG. 5*a* and FIG. 5*b*), or the first power branch line 110, the second power branch line 120, and the third power branch line 130 are connected to the signal input line 150 (as shown in FIG. 5*c*), to implement a phase allocation function of the feed stripline 100 in this application.

As shown in implementations in FIG. 5*a*, FIG. 5*b*, and FIG. 5*c*, at positions at which the signal input line 150 is separately conducted to the first power branch line 110 and the second power branch line 120 (where in FIG. 5*c*, the third power branch line 130 is further included), signals sent by the signal input line 150 may be separately conducted to the first power branch line 110 and the second power branch line 120 (where the third power branch line 130 may be further included), and signals received by the signal input line 150 may also be separately obtained through the first power branch line 110 and the second power branch line 120 (where the third power branch line 130 may be further included). Positions at which the signal input line 150 is connected to the first power branch line 110 and the second power branch line 120 (where the third power branch line 130 may be further included) are power dividers.

Refer to FIG. 4. The first input segment 151 and the second input segment 152 have different extension lengths. Correspondingly, the first power branch line 110 and the second power branch line 120 also have different extension lengths, and equivalent dielectric constants of the first power branch line 110 and the second power branch line 120 are also different. A phase of an electrical signal flowing through the first input segment 151 and the first power branch line 110 to the first signal output port 1021 is different from a phase of the electrical signal flowing through the first input segment 151 and the second power branch line 120 to the second signal output port 1022. Correspondingly, extension lengths of the third power branch line 110 and the fourth power branch line 140 are also different, and phases of the third signal output port 1023 and the fourth signal output port 1024 are also different. In this way, after an electrical signal flows into the feed stripline 100 from the signal input port 101, when the electrical signal arrives at different signal output ports 102 through different power branch lines, phases of the electrical signal are different.

Refer to FIG. 3, for the phase shifter 300 in this application, the sliding medium 301 further covers the first input segment 151, the second input segment 152, and each power branch line. As mentioned above, each power branch line mainly extends along the first direction 001. After the first input segment 151 and the second input segment 152 are disposed to extend mainly along the first direction 001, the sliding medium 301 may cover the first input segment 151, the second input segment 152, and each power branch line along the first direction 001. In this case, the sliding medium 301 slides relative to the cavity 200, and lengths of the first input segment 151 and the second input segment 152 that are correspondingly covered by the sliding medium 301 and a length of each power branch line correspondingly covered by the sliding medium 301 also change synchronously.

When the sliding medium 301 covers the first input segment 151 and the first power branch line 110, equivalent dielectric constants of coverage parts of the first input segment 151 and the first power branch line 110 may be changed. When the equivalent dielectric constants of the first input segment 151 and the first power branch line 110 change synchronously under an action of the sliding medium 301, an actual electrical length from the signal input port 101 to the first signal output port 1021 is also adjusted accordingly. It may be understood that, sliding of the sliding medium 301 further synchronously changes a coverage length of the sliding medium 301 for the second power branch line 120, and causes adjustment of an equivalent dielectric constant of the second power branch line 120 and corresponding adjustment of an electrical length of the second power branch line 120. Further, electrical lengths of the third power branch line 130 and the fourth power branch line 140 are adjusted synchronously. In this application, the phase shifter 400 may change phase angle differences between the first output port 1021, the second output port 1022, the third output port 1023, and the fourth output port 1024 by sliding the sliding medium 301, to implement a function of adjusting a phase angle of an electrical signal.

It may be understood that, when electrical signals are separately input from the first output port 1021, the second output port 1022, the third output port 1023, and the fourth output port 1024 and transmitted to the signal input port 101, the electrical signals obtained by the signal input port 101 also undergoes phase adjustment due to electrical length differences between the first power branch line 110, the second power branch line 120, the third power branch line 130, and the fourth power branch line 140.

It should be noted that, in the structure shown in FIG. 3, the sliding medium 301 covers the first input segment 151, the second input segment 152, and each power branch line. In some other embodiments, the sliding medium 301 may alternatively cover only the first input segment 151 and the second input segment 152, and adjust phase differences between the signal output ports 102 by changing electrical lengths of the first input segment 151 and the second input segment 152. Alternatively, the sliding medium 301 may cover only the first power branch line 110, the second power branch line 120, the third power branch line 130, and the fourth power branch line 140, and adjust phase differences between the signal output ports 102 by changing electrical lengths of the power branch lines.

Figure 6:
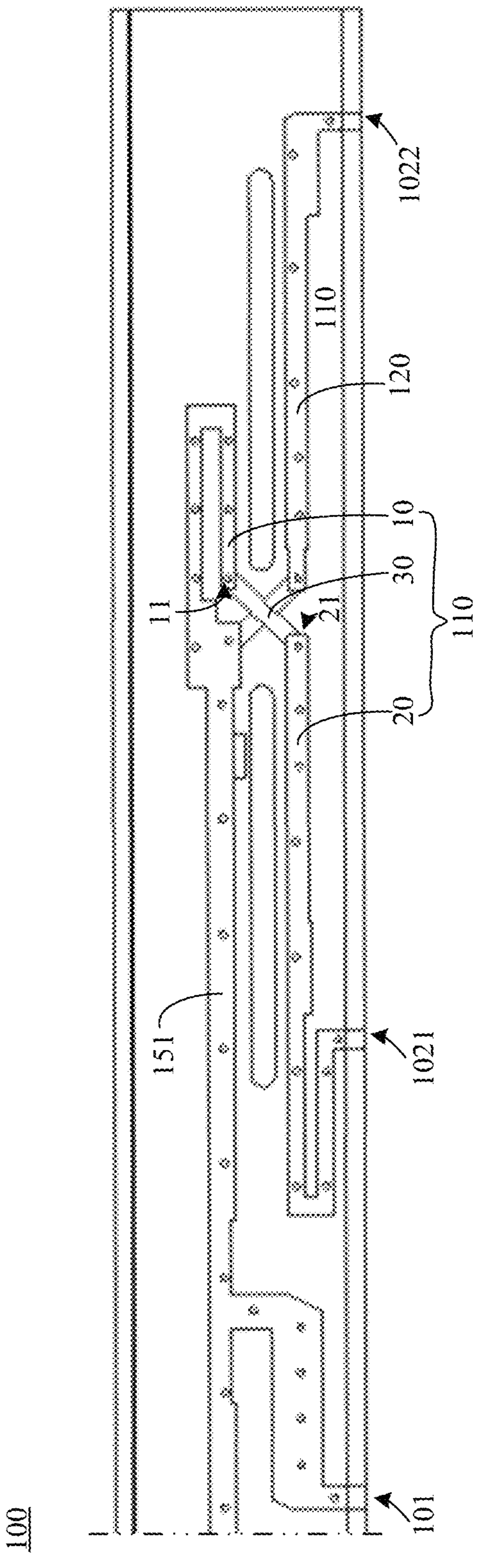
FIG. 6 is a schematic diagram of a local structure of a feed stripline according to FIG. 4.

Refer to a schematic diagram of a structure of the feed stripline 100 on one side of the first output segment 151 shown in FIG. 6. The first power branch line 110 and the second power branch line 120 are further disposed on the side of the first output segment 151. The first power branch line 110 is disconnected into a first segment 10 and a second segment 20 along an extension direction of the first power branch line 110. The first segment 10 is located on a side close to the first output segment 151, and is connected to the first output segment 151. The second segment 20 is located on a side close to the first signal output port 1021. In addition, the first segment 10 and the second segment 20 are distributed on two opposite sides of the second power branch line 120. In other words, the first segment 10 includes, along an extension direction of the first segment 10, a first end 11 far away from the first output segment 151, and the first end 11 is close to the second power branch line 120 and is located on one side of the second power branch line 120; and the second segment 20 includes a second end 21 close to the second power branch line 120, and the second end 21 is also close to the second power branch line 120 and is located on the other side of the second power branch line 120 relative to the first end 11. The first segment 10 and the second segment 20 are distributed on two sides of the second power branch line 120 and are disconnected from each other.

The first power branch line 110 further includes a jump structure 30, where the jump structure 30 is located between the first segment 10 and the second segment 20, and is spaced from the second power branch line 120. The jump structure 30 is fastened relative to the first segment 10 and the second segment 20, and is configured to implement a signal transmission function between the first segment 10 and the second segment 20. Specifically, because the first power branch line 110 is disconnected into the first segment 10 and the second segment 20 that are spaced from each other, after an electrical signal transmitted on the first power branch line 110 arrives at the first end 11, the signal at the first end 11 is transmitted to the second end 21 under an action of the jump structure 30 fastened relative to the first segment 10 and the second segment 20, and the electrical signal is further transmitted to the first signal output port 1021 through the second segment 20, to implement a function of transmitting the electrical signal on the entire first power branch line 110.

Figure 7:
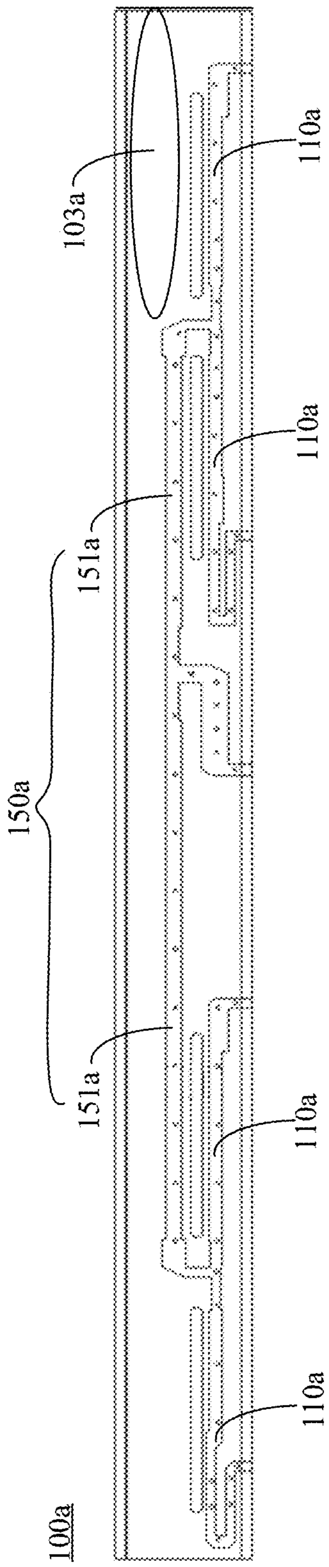
FIG. 7 is a schematic diagram of a structure of a feed stripline in a conventional technology.

Refer to a structure of an existing feed stripline 100*a* shown in FIG. 7. The existing feed stripline 100*a* also includes an existing signal input line 150*a*, two existing output segments 151*a*, and a plurality of existing power branch lines 110*a*, and the existing signal input line 150*a*, the two existing output segments 151*a*, and the plurality of existing power branch lines 110*a* are all located in a same plane. The lines do not cross. Particularly, at a position corresponding to one side of the first output segment 151 in the feed stripline 100 in this application, the existing output segment 151*a* is also connected to two existing power branch lines 110*a*. In addition, because the two existing power branch lines 110*a* do not cross, an idle area 103*a* that cannot be used exists in the existing feed stripline 100*a*. To reach preset extension lengths, the two existing power branch lines 110*a* can extend only in areas in which the two power branch lines are separately located, to form a relative phase difference. It may be understood that when the two existing power branch lines 110*a* separately extend in the areas in which the two power branch lines are separately located, areas required by the two power branch lines 110*a* increase correspondingly with the lengths required for extension. With reference to an area of the idle area 103*a* formed because the existing power branch lines 110*a* cannot cross, an overall area of the existing feed stripline 100*a* is correspondingly increased, which is not conducive to size control of the feed stripline 100*a*. A larger size further increases transportation and installation costs of the existing feed stripline 100*a*. In addition, volumes of products such as an existing phase shifter, an array antenna, and a base station that use the existing feed stripline 100*a* also increase correspondingly, which is also not conducive to transportation and installation.

However, in this application, the feed stripline 100 disconnects the first power branch line 110 into the first segment 10 and the second segment 20 that are independent of each other, and implements signal transmission between the first segment 10 and the second segment 20 through the jump structure 30, so that the first segment 10 and the second segment 20 may be separately located on two opposite sides of the second power branch line 120. In this way, an extension area of the first power branch line 110 is expanded, and an idle area is eliminated. An overall size of the feed stripline 100 in this application is controlled, and transportation and installation costs of the feed stripline 100 in this application are reduced.

Particularly, in the structure of the suspended stripline 300 provided in embodiments of this application, internal space of the cavity 200 is limited due to costs and a processing process. After the structure of the feed stripline 100 in this application is used, because a plane area ratio of the feed stripline 100 in this application is smaller, the size of the feed stripline 100 can be compressed on a premise of implementing a same tilt, so that an overall volume of the suspended stripline 300 in this application can also be controlled.

It may be understood that, because the feed stripline 100 in this application is used or included, the phase shifter 403, the array antenna 400, and the base station in this application each have a smaller volume, and transportation and installation costs are also reduced.

It may be understood that, for the plurality of power branch lines in the feed stripline 100, a specific quantity of power branch lines that are provided with the jump structure 30 and that cross another power branch line is not limited in this application. In other words, based on a specific extension length requirement of each power branch line in the feed stripline 100, a quantity of power branch lines, in the plurality of power branch lines, that are disconnected into two relative segments connected through the jump structure 30 may be randomly set. For example, the jump structure 30 may also be disposed for the third power branch line 130, so that the third power branch line 130 can extend on two opposite sides of the fourth power branch line 140, to improve area utilization on a side of the feed stripline 100 that is close to the second transmission segment 152 in this application. This application shows only an embodiment in which one of the plurality of power branch lines includes the jump structure 30.

In another aspect, for the first power branch line 110, a third segment (not shown in the figure) that is obtained through disconnection may be further disposed on the basis that the first power branch line 110 is disconnected into the first segment 10 and the second segment 20, where the third segment and the second segment 20 are disconnected from each other, and the third segment and the first segment 10 are located on one side of the second power branch line 120. In this case, a signal transmission function between the second segment 20 and the third segment may also be implemented through the jump structure 30, and a cabling form in which the first power branch line 110 crosses the second power branch line 120 twice is more conducive to arrangement of the first power branch line 110. It may be understood that, the first power branch line 110 may be further provided with disconnected structures such as a fourth segment and a fifth segment, and the first power branch line 110 may be used together with a plurality of jump structures 30 to implement crossing of the first power branch line 110 relative to the second power branch line 120. A specific disposition manner may be determined based on an extension length and a working requirement of the first power branch line 110.

In a possible implementation, both the signal input line 150 and the second power branch line 120 are located in a first plane (not shown in the figure), and the first segment 10 and the second segment 20 of the first power branch line 110 are also located in the first plane, to facilitate synchronous manufacturing of the first segment 10, the second segment 20, the signal input line 150, and the second power branch line 120. The jump structure 30 is at least partially located outside the first plane, to implement mutual isolation between the jump structure 30 and the second power branch line 120.

Figure 8:
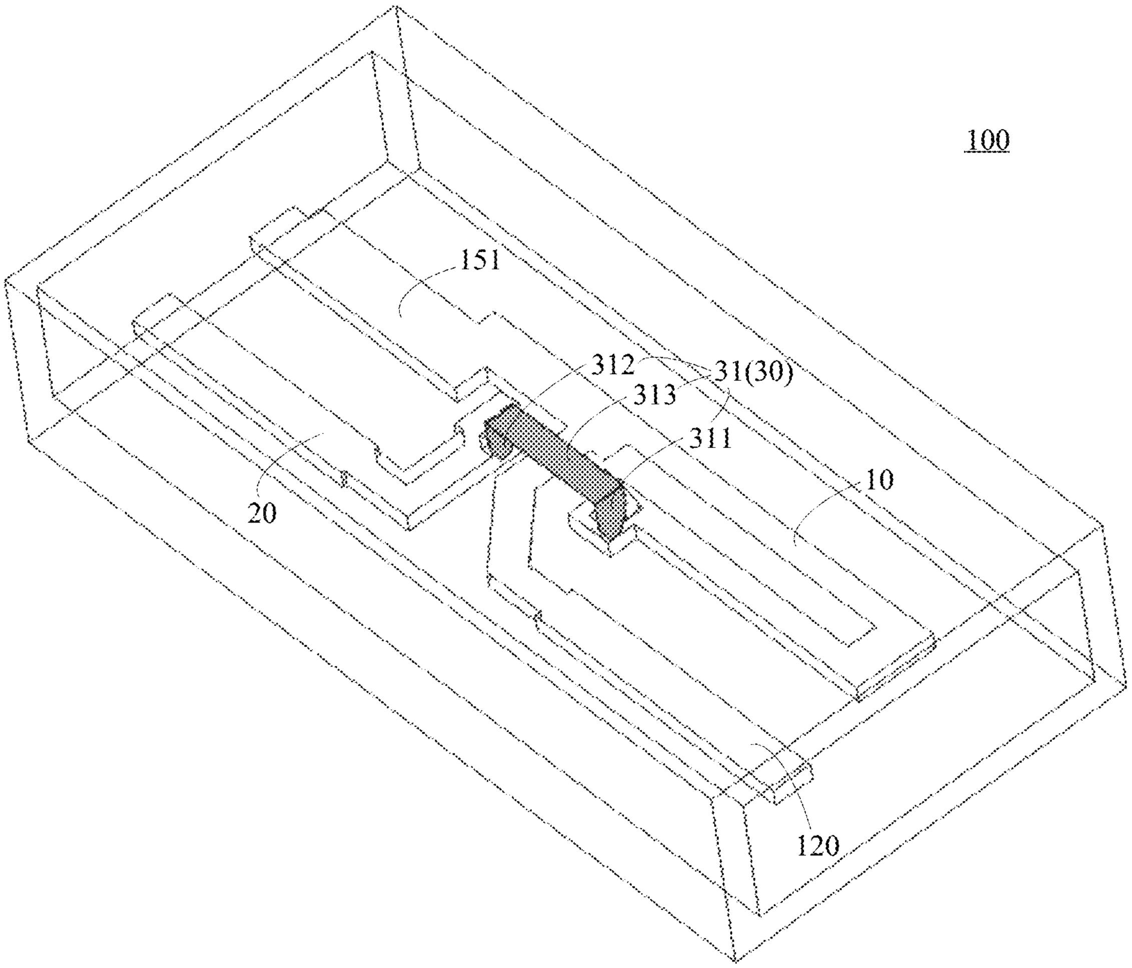
FIG. 8 is a schematic diagram of a structure of an implementation of a jump structure in a feed stripline according to FIG. 4.
Figure 9:
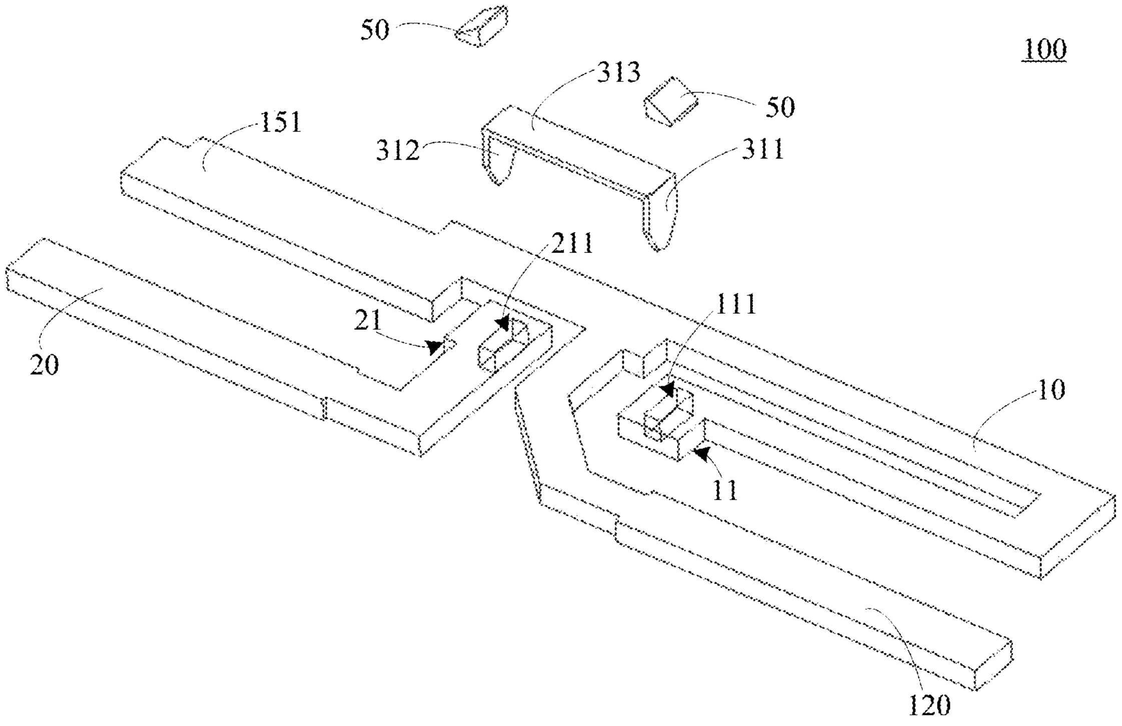
FIG. 9 is a schematic exploded view of an implementation of a jump structure according to FIG. 8.

Refer to an implementation of the jump structure 30 shown in FIG. 8 and FIG. 9. As shown in FIG. 8 and FIG. 9, the jump structure 30 is constructed in a form of a bridged jumper 31. The jumper 31 is conductive, and includes a connection segment 313, a first pin 311, and a second pin 312. The first pin 311 and the second pin 312 are distributed at two opposite ends of the connection segment 313, in other words, the connection segment 313 is connected between the first pin 311 and the second pin 312. A length direction of the connection segment 313 is disposed along the extension direction of the first power branch line 110, the first pin 311 is located on a side close to the first segment 10, and the second pin 312 is located on a side close to the second segment 20. The connection segment 313 and the second power branch line 120 are disposed at an interval. The connection segment 313 is connected between the connection segment 313 and the first segment 10 through the first pin 311, and is fastened and conducted relative to the first segment 10. The connection segment 313 is further connected between the connection segment 313 and the second segment 20 through the second pin 312, and is fastened and conducted relative to the second segment 20.

In an implementation, the first pin 311, the second pin 312, and the connection segment 313 are of an integrated structure, that is, the jump structure 30 is integrally formed. In this case, connections between the connection segment 313 and the first pin 311 and the second pin 312 are more stable. This improves reliability of the first power branch line 110.

A specific shape of the jump structure 30 is not specially limited in embodiments of this application. The jump structure 30 may be an are that crosses the second power branch line 120, or may be in any curved shape. As long as a jump structure is isolated from the second power branch line 120 and implements an electrical connection between the first segment 10 and the second segment 20, the jump structure may be used as the jump structure in the feed stripline 100 in this application. In an embodiment, the connection segment 313 is further located in a second plane, and the first plane is parallel to the second plane. Therefore, in a process in which the connection segment 313 crosses the second power branch line 120, a height difference between the connection segment 313 and the second power branch line 120 is always stable. This helps control signal interference between the connection segment 313 and the second power branch line 120.

As shown in FIG. 8 and FIG. 9, the first pin 311 may be relatively fastened and conducted to the first segment 10 through welding, and the second pin 312 may also be relatively fastened and conducted to the second segment 20 through welding. Solders 50 are further stacked between the jumper 31 and the first segment 10 and between the jumper 31 and the second segment 20. After arriving at the first end 11, an electrical signal input from the first segment 10 may be transferred to the connection segment 313 through the first pin 311, and then transmitted to the second pin 312 through the connection segment 313 after crossing the second power branch line 120. Finally, the electrical signal is transmitted from the second pin 312 to the second segment 20 through the second end 21, and is output from the first signal output port 1021. On the contrary, when an electrical signal is input from the first signal output port 1021, the electrical signal may be sequentially transferred to the second pin 312, the connection segment 313, the first pin 311, and the first segment 10 through the second segment 20, and finally transferred to the signal input line 150 through the power divider. The bridged jumper 31 is disposed overhead the first plane and crosses the second power branch line 120, and then is connected and conducted to the first segment 10 and the second segment 20, to achieve an effect of transmitting an electrical signal between the first segment 10 and the second segment 20.

Figure 10:
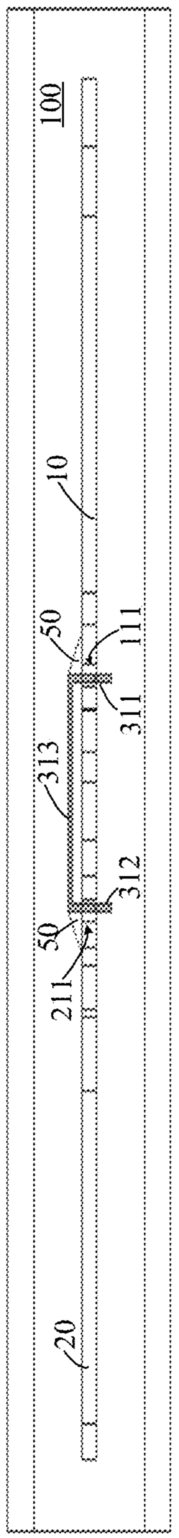
FIG. 10 is a schematic diagram of a structure of another observation angle of an implementation of a jump structure according to FIG. 8.

In the embodiment of FIG. 8 and FIG. 9, a first opening 11 is further disposed at the first end 11, and an appearance of the first opening 11 is disposed corresponding to an appearance of the first pin 311, so that the first pin 311 may pass through the first opening 111 (refer to FIG. 10). In this case, the first pin 311 may be separately welded and fastened to two opposite surfaces of the first segment 10, to further improve stability of a connection between the first pin 311 and the first segment 10. In addition, the first opening 111 may be further configured to position the jumper 31 relative to the first segment 10. Correspondingly, a second opening 211 is also disposed at the second end 21, an appearance of the second opening 211 also matches that of the second pin 312, and the second pin 312 may pass through the second opening 211 and be welded and fastened to two opposite surfaces of the second segment 20. The second opening 211 may also be used for positioning between the jumper 31 and the second segment 20.

Figure 11:
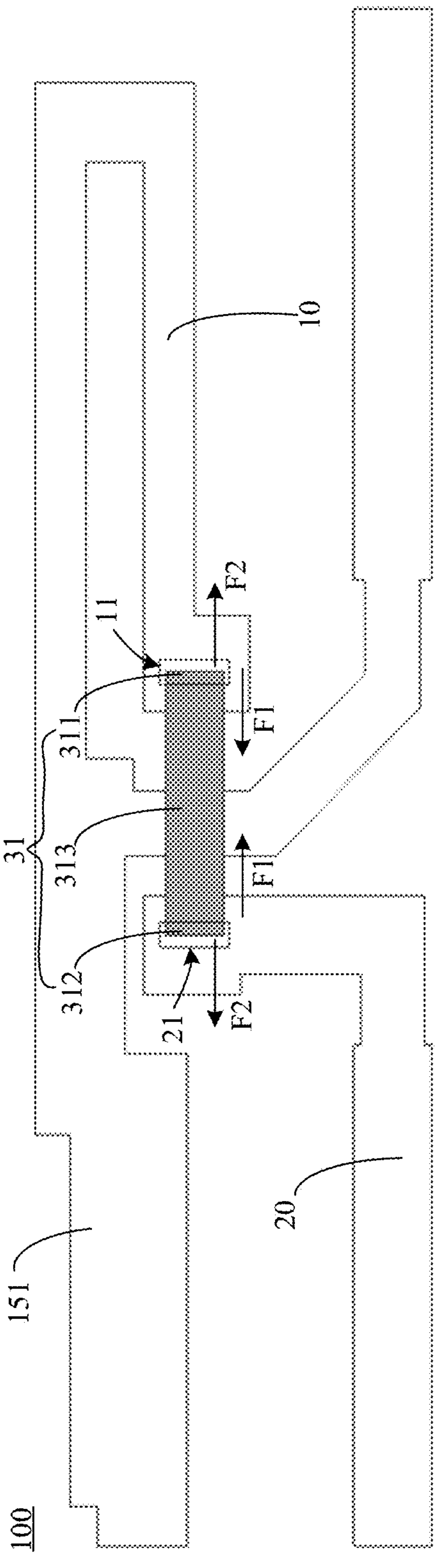
FIG. 11 is a schematic diagram of a structure of another implementation of a jump structure according to FIG. 8.

In an implementation, the jumper 31 is elastic. When the first pin 311 and the second pin 312 of the jumper 31 respectively extend into the first opening 111 and the second opening 211, elastic deformation occurs between the first pin 311 and the second pin 312, and an elastic force F1 (refer to FIG. 11) of drawing together is formed between the first pin 311 and the second pin 312. The elastic force F1 enables the first pin 311 to be in abutted contact with an inner wall on one side of the first opening in, enables the second pin 312 to be in abutted contact with an inner wall on one side of the second opening 211, and may maintain reliable contact between the jumper 31 and the first segment 10 and the second segment 20. In this case, the jumper 31 may be in abutted contact with the first segment 10 and the second segment 20, and may be welded on the basis of the elastic jumper 31. Both can ensure reliable overlap contact between the first pin 311 and the first opening in and between the second pin 312 and the second opening 211.

It may be understood that, when elastic deformation occurs between the first pin 311 and the second pin 312, an elastic force F2 of stretching apart may be further formed between the first pin 311 and the second pin 312, and beneficial effects similar to those in the foregoing embodiment can also be implemented.

In another aspect, in addition to welding or butted conduction, the first pin 311 and the first segment 10 may alternatively be butted in manners such as buckling and bonding. Correspondingly, the second pin 312 and the second segment 20 may also be butted in manners such as buckling and bonding. This does not affect function implementation of the feed stripline 100 in this application.

In an embodiment, a line width of the connection segment 313 may be further set to be less than or equal to a line width of the first segment 10 and less than or equal to a line width of the second segment 10. This is used to control impedance matching between the jumper 31 and the first segment 10 and the second segment 20, to reduce a loss at the jumper 31 and improve overall electrical performance of the first power branch line 110.

Figure 12:
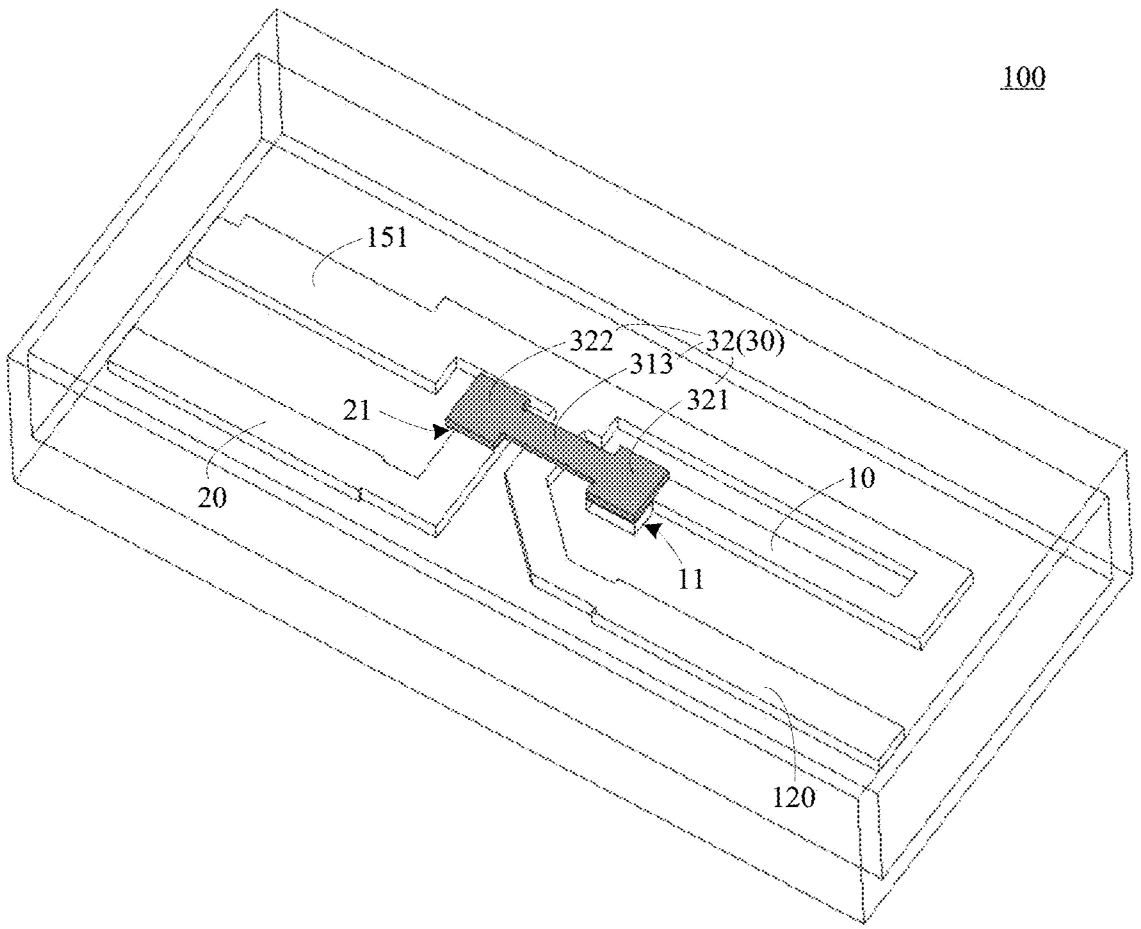
FIG. 12 is a schematic diagram of a structure of another implementation of a jump structure in a feed stripline according to FIG. 4.
Figure 13:
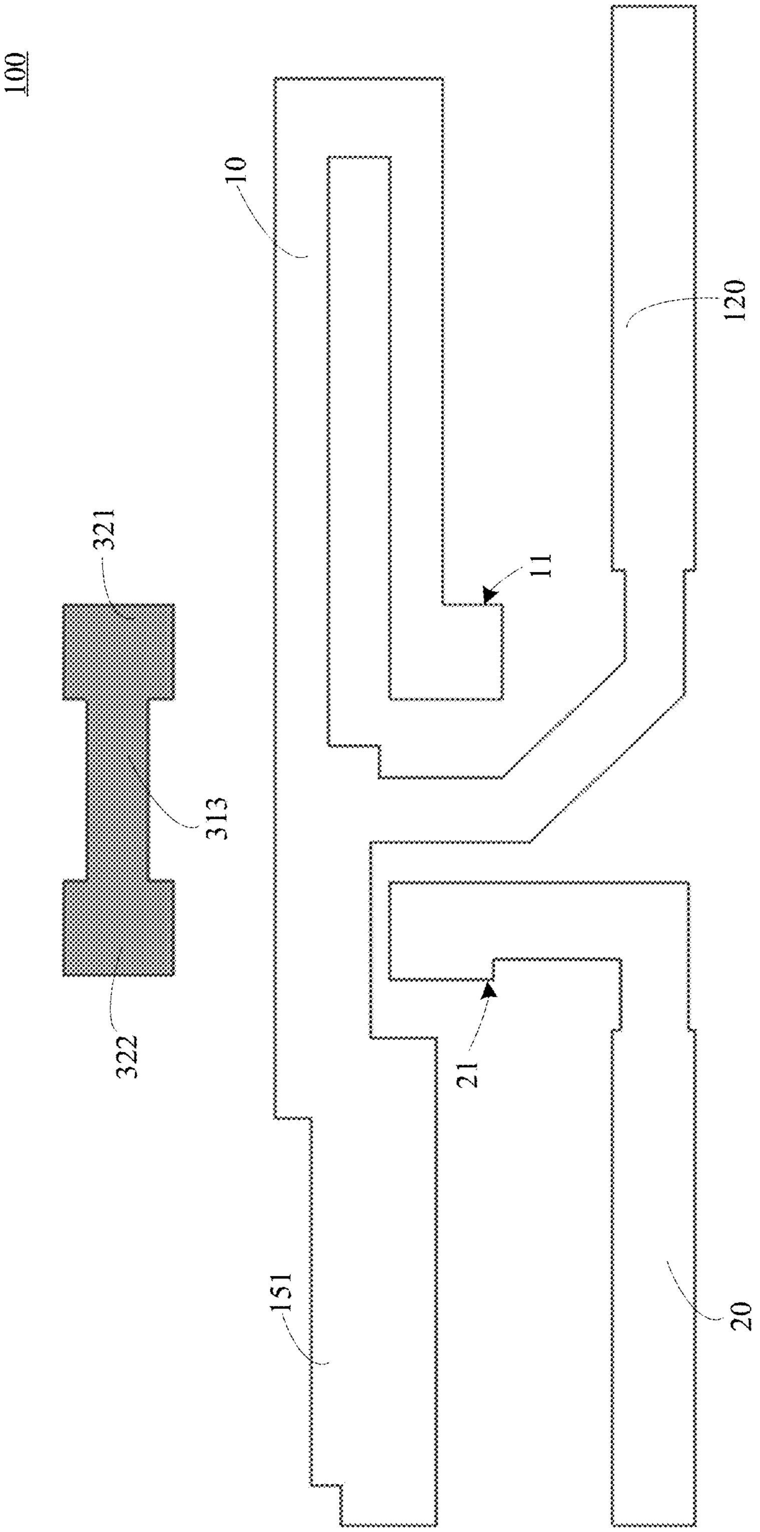
FIG. 13 is a schematic exploded view of an implementation of a jump structure according to FIG. 12.

FIG. 12 and FIG. 13 show an embodiment of another form of the jump structure 30. As shown in FIG. 12 and FIG. 13, the jump structure 30 is constructed as a patch 32. The patch 32 includes a first coupling end 321, a second coupling end 322, and a connection segment 313 connected between the first coupling end 321 and the second coupling end 322. The patch 32, the first segment 10, and the second segment 20 are disposed separately, and a projection of the first coupling end 321 on the first plane at least partially overlaps the first end 11. Therefore, the first end 11 and the first coupling end 321 may form a coupled electrical connection, and an electrical signal on the first segment 10 is transmitted to the first coupling end 321 in a coupling manner. Similarly, a projection of the second coupling end 322 on the first plane also at least partially overlaps the second end 21. Therefore, the second coupling end 322 may transfer an electrical signal to the second end 21 in a coupling manner, and the electrical signal is further transmitted through the second segment 20.

In an implementation, a first coupling capacitor is formed between the first coupling end 321 and the first segment 10, and a second coupling capacitor is formed between the second coupling end 322 and the second segment 20. A capacitor structure is separately formed between the jump structure 30 and the first segment 10 and the second segment 10, and a coupling electrical connection is implemented in a form of the first coupling capacitor and the second coupling capacitor. In some other embodiments, coupling may alternatively be implemented between the first coupling end 321 and the first segment 10 and between the second coupling end 322 and the second segment 20 by forming inductance.

Figure 14:
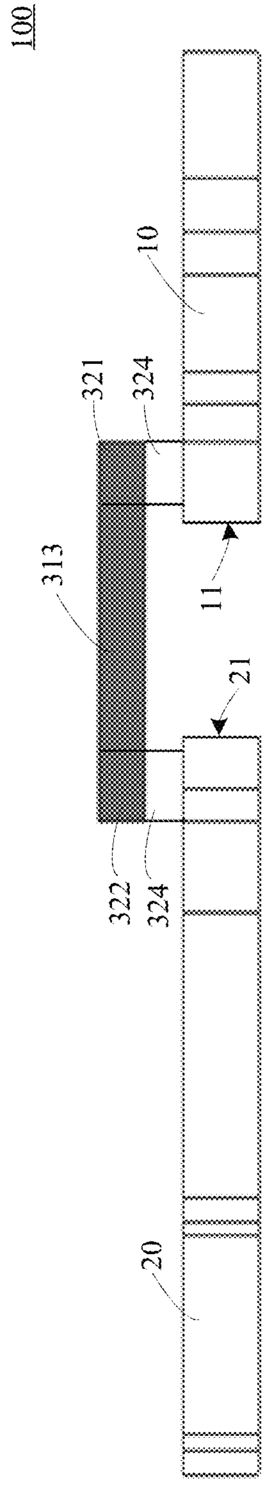
FIG. 14 is a schematic diagram of a structure of another implementation of a jump structure according to FIG. 12.

Refer to an embodiment of FIG. 14. In the jump structure 30 in the form of the patch 32, an isolation pad 324 is further sandwiched between the patch 32 and the first power branch line 110. The isolation pad 324 is an insulation material and may be formed through injection molding. The isolation pad 324 is configured to implement insulation and fastening between the patch 32 and the first power branch line 110, to form the first coupling capacitor and the second coupling capacitor.

Specifically, there are two isolation pads 324, and the two isolation pads 324 are separately located between the first coupling end 321 and the first segment 10 and between the second coupling end 322 and the second segment 20. The first coupling end 321 and the second end 12 of the first segment 10 are disposed at an interval, and the isolation pad 324 is configured to fasten and support the first coupling end 321. In an embodiment, the two isolation pads 324 are separately located at the first end 11 and the second end 21, the first coupling end 321 is fastened and connected to an isolation pad 324 located at the first end 11, and the second coupling end 322 is fastened and connected to an isolation pad 324 located at the second end 21.

The feed stripline 100 in the foregoing embodiment is expanded based on a structure of a sheet metal strip. In some other embodiments, the feed stripline 100 may alternatively be a PCB (printed circuit board) strip manufactured on a printed circuit board, or in another strip form.

Figure 15:
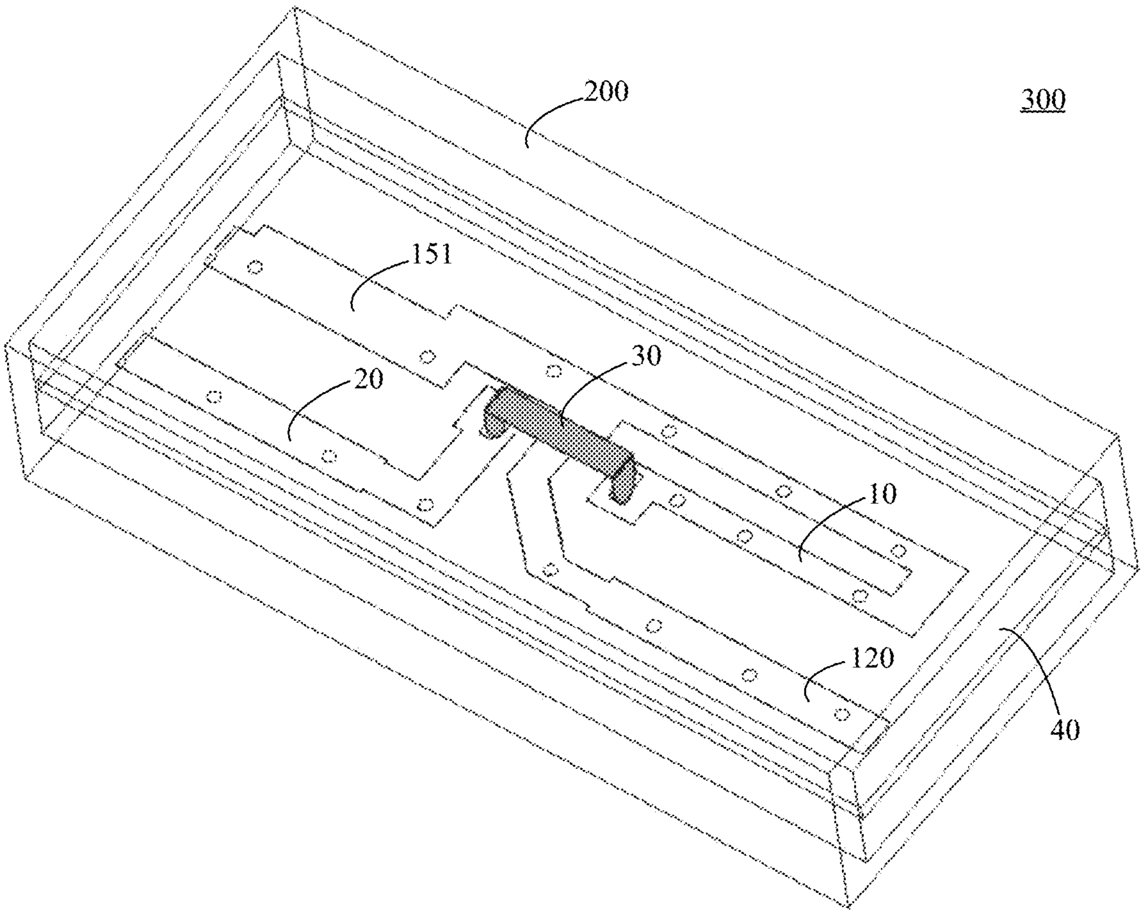
FIG. 15 is a schematic diagram of a structure of still another implementation of a jump structure in a feed stripline according to FIG. 4.
Figure 16:
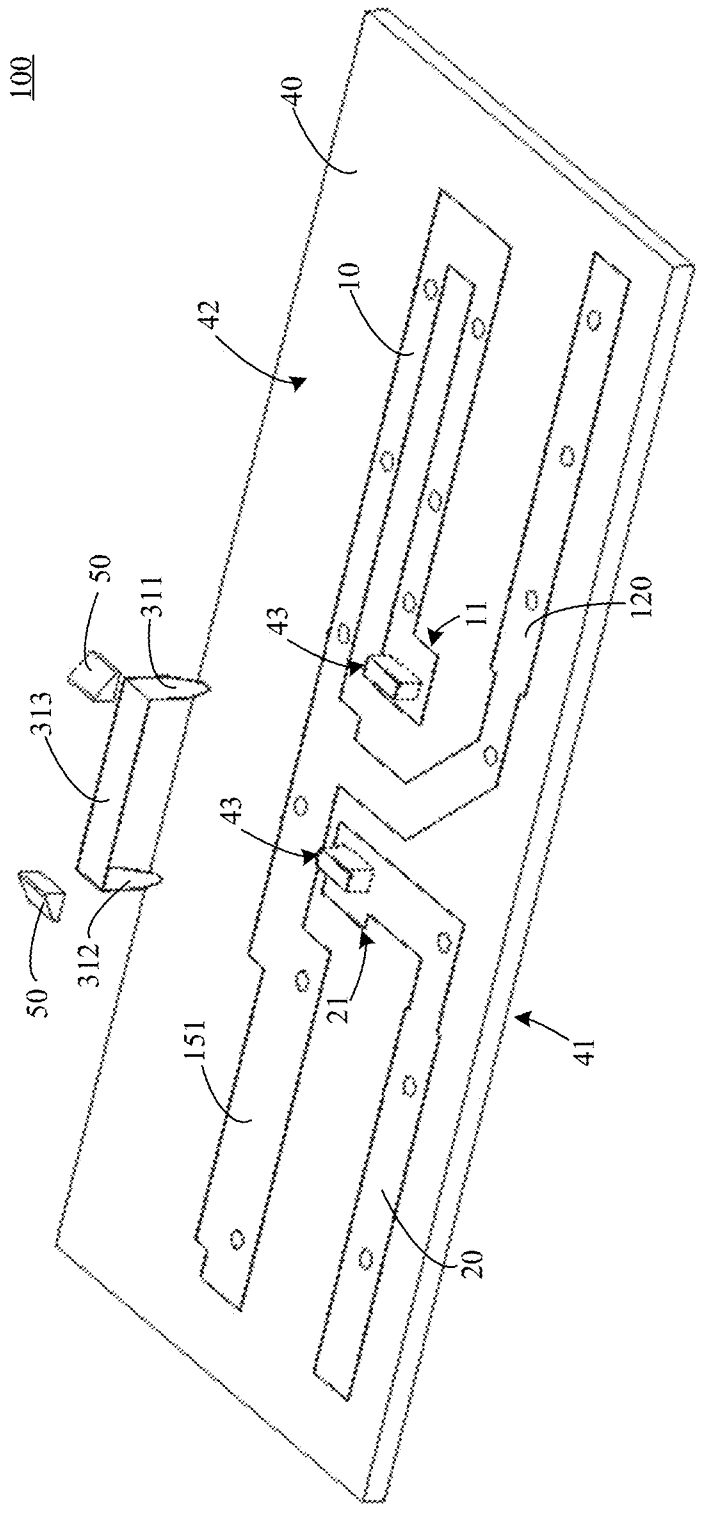
FIG. 16 is a schematic exploded view of an implementation of a jump structure according to FIG. 15.

Refer to structures shown in FIG. 15 and FIG. 16. The feed stripline 100 further includes a printed circuit board 40. When the feed stripline 100 is disposed in the cavity 200 and forms the suspended stripline 300 together with the cavity 200, the printed circuit board 40 is further fastened in the cavity 200. The signal input line 150, the second power branch line 120, the first power branch line 110, and the jump structure 30 are all located on the printed circuit board 40. The printed circuit board 40 may form reliable support for the feed stripline 100, and implement insulation and fastening of the feed stripline 100 relative to the cavity 200 in the implementation of the suspended stripline 300.

Figure 17:
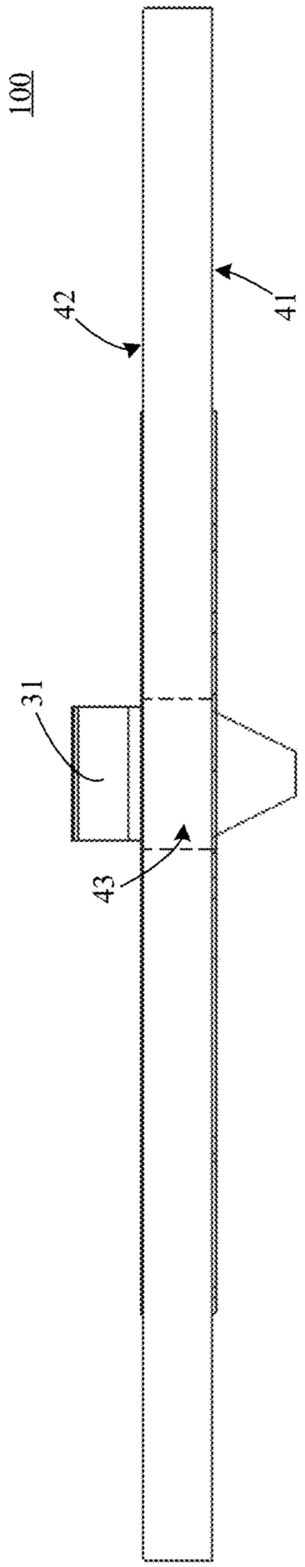
FIG. 17 is a schematic diagram of a structure of another observation angle of an implementation of a jump structure according to FIG. 15.

For details, refer to FIG. 17. The printed circuit board 40 has a first external surface 41. The signal input line 150, the second power branch line 120, the first segment 10, and the second segment 20 are all attached to the first external surface 41, and are constructed as the first plane on the first external surface 41. In other words, the first plane formed by constructing the signal input line 150, the second power branch line 120, the first segment 10, and the second segment 20 is attached to the first external surface 41. The printed circuit board 40 further includes a second external surface 42, and the second external surface 42 is disposed opposite to the first external surface 41. The connection segment 313 may be attached to the second external surface 42, and constructed to form the second plane (not shown in the figure) on the second external surface 42. In other words, the second plane formed by constructing the connection segment 313 is attached to the second external surface 42. In this way, the first plane and the second plane are formed as two metal surfaces disposed opposite to each other on the printed circuit board 40, where the first plane is constructed as a first metal surface, and the second plane is constructed as a second metal surface. As shown in FIG. 17, the connection segment 313 and the second external surface 42 are disposed at an interval, and a signal transmission function of the jump structure 30 can also be implemented.

In some other embodiments, grooves (not shown in the figure) may be further disposed on the first external surface 41 and the second external surface 42 correspondingly. The groove is configured to accommodate lines of the feed stripline 100, so that at least a part of the lines of the feed stripline 100 are accommodated in the groove. In this case, a bottom surface of the feed stripline 100 is lower than the first external surface 41 and the second external surface 42. In some embodiments, when the feed stripline 100 is completely accommodated in the groove, a top surface of the feed stripline 100 is further flush with the first external surface 41 and the second external surface 42. These embodiments are all possible implementations of the PCB strip, and are also implementations in which the feed stripline 100 in this application is located on the printed circuit board 40.

Refer to FIG. 16. A via 43 is disposed on the printed circuit board 40, penetrates the first external surface 41 and the second external surface 42, and is connected between the first plane and the second plane. The first pin 311 and the second pin 312 are separately constructed as conductive elements that pass through the via 43, and are connected between the first segment 10 on the first plane and the connection segment 313 on the second plane and between the second segment 20 on the first plane and the connection segment 313 on the second plane. The via 43 may be manufactured on the printed circuit board 40 by using an existing process, and then the first pin 311 and the second pin 312 are disposed to separately pass through the via 43, so that the jump structure 30 can reliably overlap each of the first segment 10 and the second segment 20.

As shown in FIG. 16, the jump structure 30 is still disposed as the jumper 31. The first pin 311 and the second pin 312 of the jumper 31 separately pass through the via 43, and are respectively fastened and conducted to the first segment 10 and the second segment 20 through welding, to achieve an objective of signal transmission. It may be understood that, in the embodiment of FIG. 16, the via 43 is also configured to form structures of the first opening 111 and the second opening 211. As shown in FIG. 17, the jumper 31 extends into the via 43 from the side of the second external surface 42 of the printed circuit board 40, and extends out from the side of the first external surface 41. In this case, the first segment 10 and the second segment 20 are respectively welded and fastened to the first pin 311 and the second pin 312 on the side of the first external surface 41, and the first pin 311 and the second pin 312 are more firmly connected to the first segment 10 and the second segment 20 under a joint action of welding and the via 43.

In some other implementations, the via 43 may alternatively be separately constructed as a conductive via (not shown in the figure). In this case, the via 43 is filled with a conductive material, such as metal. When the connection segment 313 is attached to the second external surface 42, and the first segment 10 and the second segment 20 are attached to the first external surface 41, the connection segment 313 is electrically conducted to the first segment 10 and the second segment 20 through the conductive via. In some other embodiments, the jump structure 30 is disposed as the patch 32. The patch 32 is constructed as the second plane and is attached to the second external surface 42. The patch 32 performs signal transmission with the first segment 10 and the second segment 20 through coupling, so that a function of transmitting a signal by the first power branch line 110 is also implemented.

Figure 18:
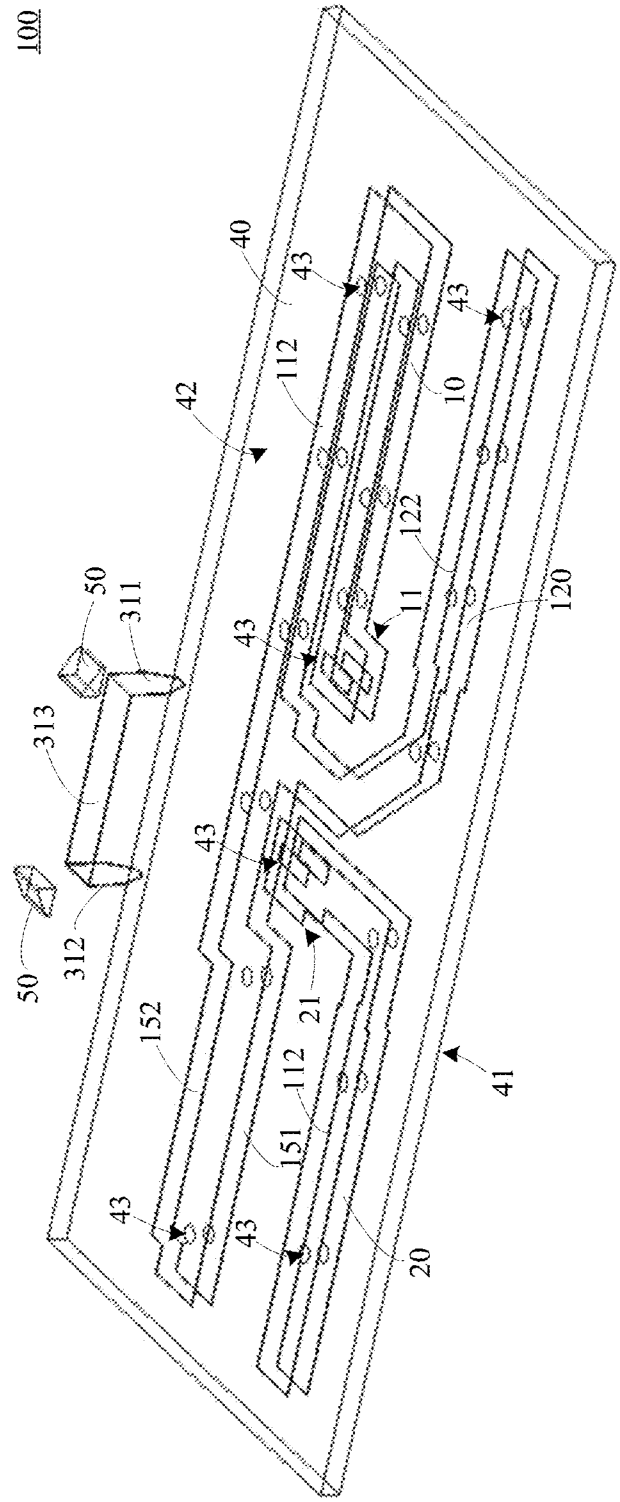
FIG. 18 is a schematic exploded view of another implementation of a jump structure according to FIG. 15.

Refer to an embodiment shown in FIG. 18. An input match line 152, a first power match line 112, and a second power match line 122 are further disposed in the second metal surface. The input match line 152, the first power match line 112, and the second power match line 122 are all attached to the second external surface 42. Further, the input match line 152 extends in parallel with the signal input line 150, the first power match line 112 extends in parallel with the first power branch line 110, and the second power match line 122 extends in parallel with the second power branch line 120. It may be understood that the input match line 152 is also connected to the first power match line 112 and the second power match line 122. In addition, as shown in FIG. 18, the first power match line 112 is also in a disconnected state, and a disconnected position of the first power match line 112 corresponds to a disconnected position between the first segment 10 and the second segment 20 in the first power branch line 110.

In this case, on an extension path of the signal input line 150, the signal input line 150 and the input match line 152 jointly act and transmit an electrical signal sent by the signal input port 101. The second power match line 122 and the second power branch line 120 also jointly act to transmit the electrical signal to the second signal output port 1022. The first power match line 122 and the first power branch line 110 jointly cooperate with the jump structure 30, and transmit the electrical signal to the first signal output port 1021. As shown in FIG. 18, the jump structure 30 is constructed in the form of the jumper 31. The jumper 31 passes through the via 43, is in contact with the first power branch line 110 and the first power match line 112, and is conducted to both the first power branch line 110 and the first power match line 112. In this way, a function of transmitting an electrical signal on the first power branch line 110 and the first power match line 112 is implemented.

In an embodiment, the printed circuit board 40 may further have a plurality of vias 43. The plurality of vias 43 are all conductive vias, distributed at intervals along an extension direction of the signal input line 150, and configured to connect the signal input line 150 and the input match line 152, to form an electrical path between the signal input line 150 and the input match line 152, and implement impedance matching between the signal input line 150 and the input match line 152. The plurality of vias 43 may be further disposed between the first power branch line 110 and the first power match line 112, and/or between the second power branch line 120 and the second power match line 122, to form an electrical path between the two power branch lines and the match lines corresponding to the two power branch lines, and adjust respective equivalent dielectric constants of the two power branch lines.

Figure 19:
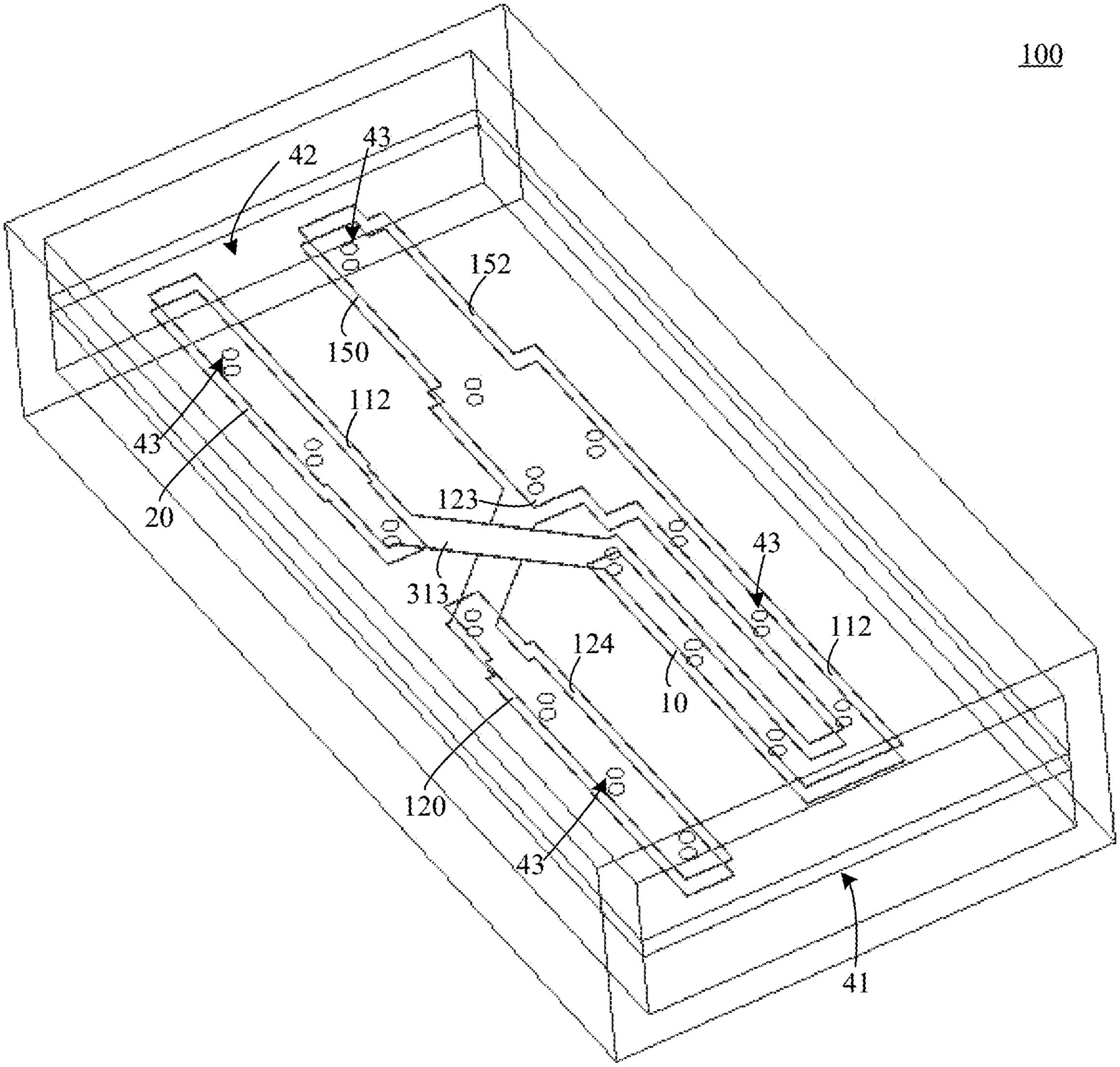
FIG. 19 is a schematic diagram of a structure of still another implementation of a jump structure according to FIG. 15.
Figure 20:
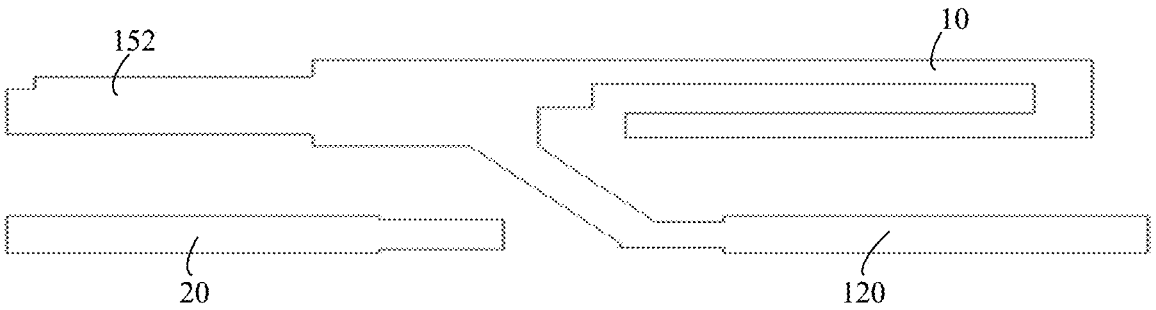
FIG. 20 is a schematic plane diagram of a first metal surface in a jump structure according to FIG. 19.
Figure 21:
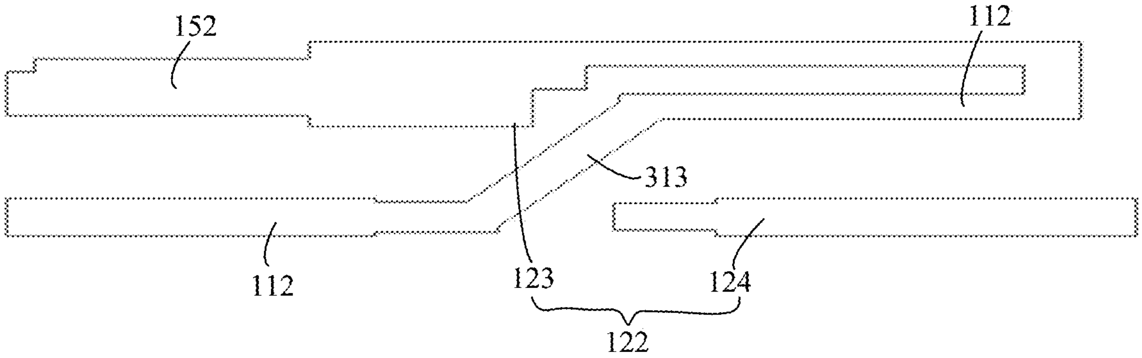
FIG. 21 is a schematic plane diagram of a second metal surface in a jump structure according to FIG. 19.

For an embodiment, refer to FIG. 19, and refer to a plane diagram of the first metal surface shown in FIG. 20 and a plane diagram of the second metal surface shown in FIG. 21. As shown in FIG. 21, the first power match line 112 is in a coherent and connected state, and the connection segment 313 is constructed as a part of a line structure in the first power match line 112. Further, as shown in FIG. 21, the second power match line 122 includes a third segment 123 and a fourth segment 124. The third segment 123 is located on one side of the connection segment 313 and extends in parallel with the second power branch line 120. The fourth segment 124 is located on the other side of the connection segment 313, and also extends in parallel with the second power branch line 120. In other words, the first power branch line 110 is in a disconnected state on the first metal surface, and the disconnected first segment 10 and second segment 20 are distributed on two sides of the second power branch line 120; and the second power match line 122 is also in a disconnected state on the second metal surface, and the disconnected third segment 123 and fourth segment 124 are distributed on two sides of the first power match line 110.

Because a plurality of vias 43 are disposed between the first power branch line 110 and the first power match line 112, and the vias 43 are conductive vias, the connection segment 313 that is constructed as a part of the line structure in the first power match line 112 may implement, through vias 43 distributed on two sides of the second power branch line 120, a function of transmitting an electrical signal on the first segment 10 to the second segment 20, and further implement transmission of the electrical signal on the first power branch line 110. A plurality of vias 43 are also disposed between the second power branch line 120 and the second power match line 122, and the plurality of vias 43 are distributed on two sides of the connection segment 313. In this case, after an electrical signal 123 on the third segment 123 is transferred to the second power branch line 120 through the via 43, the electrical signal crosses the connection segment 313 with the second power branch line 120, and is transferred to the fourth segment 124 through the via 43 on the other side of the connection segment 313, to implement transmission of the electrical signal on the second power match line 122.

Figure 22:
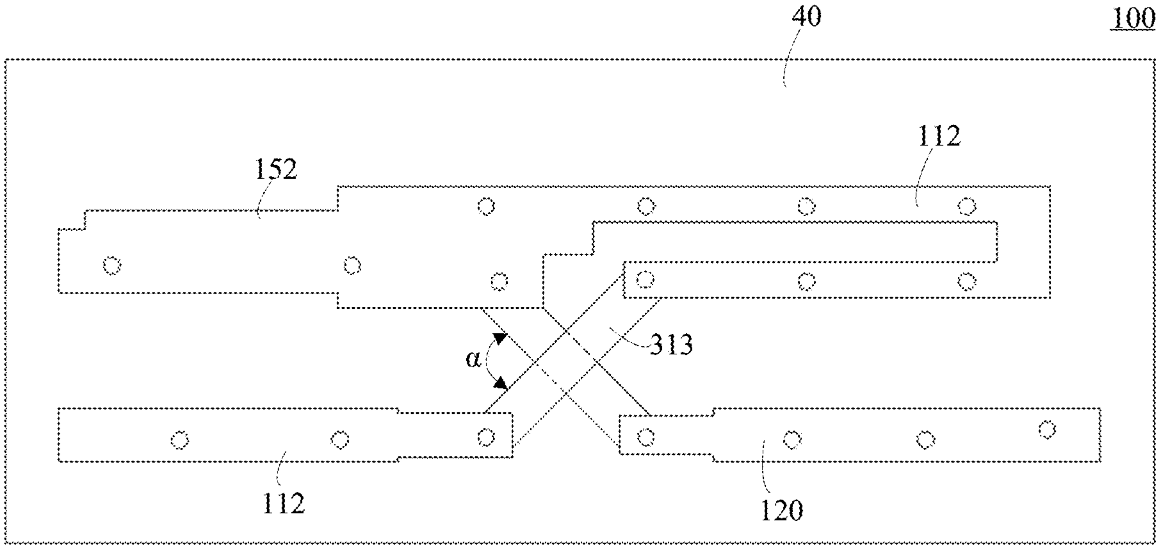
FIG. 22 is a schematic diagram of a local structure of a matching area between a jump structure and a second power branch line in a feed stripline according to FIG. 4.
Figure 23:
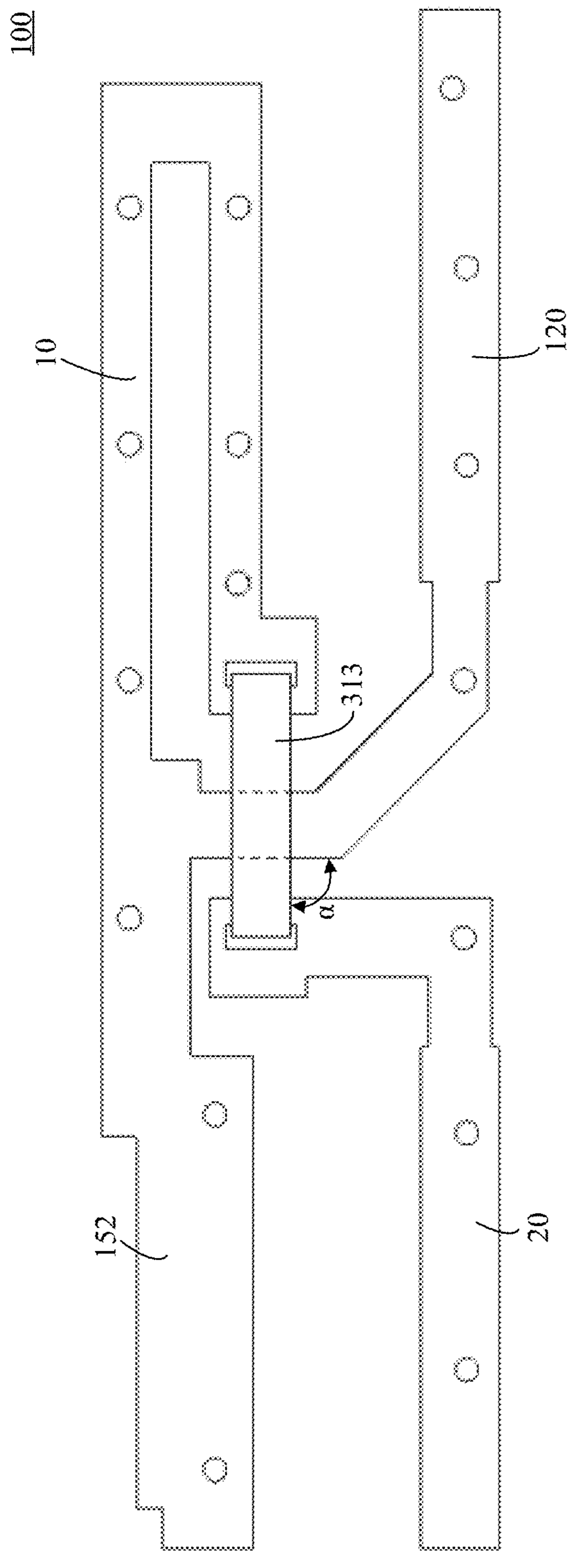
FIG. 23 is a schematic diagram of a local structure of a matching area between a jump structure and a second power branch line in a feed stripline according to FIG. 4 in another embodiment.

Refer to structures shown in FIG. 22 and FIG. 23. At a position at which the connection segment 313 crosses the second power branch line 120, an included angle $\alpha$ is formed between a projection of the connection segment 313 in the first plane and the second power branch line 120, and the included angle $\alpha$ needs to meet a condition: $45° \leq \alpha \leq 90°$. In embodiments of FIG. 22 and FIG. 23, the included angle $\alpha = 90°$. The projection of the connection segment 313 in the first plane partially overlaps the second power branch line 120, and an overlapping area increases as the included angle $\alpha$ decreases. A larger overlapping area between the connection segment 313 and the second power branch line 120 indicates greater signal interference formed between the connection segment 313 and the second power branch line 120. It may be understood that when the connection segment 313 is parallel to the second power branch line 120, that is, the included angle $\alpha = 0°$, the connection segment 313 completely overlaps the second power branch line 120. In this case, the overlapping area between the connection segment 313 and the second power branch line 120 is the largest, and electrical signal interference between the connection segment 313 and the second power branch line 120 is also the strongest. After a range of the included angle $\alpha$ is limited, the overlapping area between the connection segment 313 and the second power branch line 120 may be controlled to be in a small range, and when the included angle $\alpha = 90°$, the overlapping area between the connection segment 313 and the second power branch line 120 is the smallest. Such a setting can limit signal interference between the connection segment 313 and the second power branch line 120, and ensure stable transmission of respective electrical signals between the first power branch line 110 and the second power branch line 120.

The foregoing descriptions are merely specific embodiments of this application, but are not intended to limit the protection scope of this application. Any variation or replacement, for example, reducing or adding a mechanical part, and changing a shape of a mechanical part, readily figured out by a person skilled in the art within the technical scope disclosed in this application shall fall within the protection scope of this application. When no conflict occurs, embodiments of this application and features in embodiments may be mutually combined. Therefore, the protection scope of this application shall be subject to the protection scope of the claims.

What is claimed is:

1. A feed stripline, comprising:
a signal input line;
a first power branch line; and
a second power branch line, wherein:
a first end of the signal input line is configured to be conductively coupled to an external signal source,
a second end of the signal input line is electrically connected to each of the first power branch line and the second power branch line,
the first power branch line comprises a jump structure,
the first power branch line spans across the second power branch line from a first side of the second power branch line to a second side of the second power branch line via the jump structure, and
the jump structure and the second power branch line are spaced apart from each other.

2. The feed stripline according to claim 1, wherein:
the signal input line and the second power branch line are both located in a first plane;
the first power branch line comprises a first segment and a second segment that are located in the first plane;
the first segment and the second segment are distributed on two opposite sides of the second power branch line; and
the jump structure comprises a connection segment located in a second plane, and the connection segment is electrically connected to each of the first segment and the second segment.

3. The feed stripline according to claim 2, wherein:
the jump structure further comprises a first pin and a second pin,
the first pin and the second pin are distributed at two opposite ends of the connection segment,
the connection segment is in contact with and conductively coupled to the first segment through the first pin, and
the connection segment is further in contact with and conductively coupled to the second segment through the second pin.

4. The feed stripline according to claim 3, wherein the first pin, the second pin, and the connection segment are of an integrated structure.

5. The feed stripline according to claim 3, wherein:
the feed stripline comprises a printed circuit board;
the printed circuit board comprises a first metal surface and a second metal surface that are disposed opposite to each other;
the first metal surface is constructed as the first plane; and
the second metal surface is constructed as the second plane.

6. The feed stripline according to claim 5, wherein:
the printed circuit board comprises a via;
the via is connected between the first plane and the second plane; and
the first pin and the second pin are both constructed as conductive elements that pass through the via.

7. The feed stripline according to claim 5, wherein:
the second metal surface comprises an input match line, a first power match line, and a second power match line;
the input match line extends parallel to the signal input line;
the first power match line extends parallel to the first power branch line;
the first power match line comprises the connection segment; and
the second power match line comprises a third segment and a fourth segment;
the third segment is located on a first side of the connection segment and extends parallel to the second power branch line; and
the fourth segment is located on a second side of the connection segment opposite the first side of the connection segment and also extends parallel to the second power branch line.

8. The feed stripline according to claim 2, wherein:
the first segment comprises a first end far away from the signal input line;
the second segment comprises a second end close to the first segment;
a first opening and a second opening are respectively disposed on the first end of the first segment and the second end of the second segment;
a first pin extends into the first opening and is in contact with and conductively coupled to the first segment; and
a second pin extends into the second opening and is in contact with and conductively coupled to the second segment.

9. The feed stripline according to claim 2, wherein:
the connection segment comprises a first coupling end and a second coupling end that are opposite to each other;
a projection of the first coupling end in the first plane at least partially overlaps the first segment;
the first coupling end is electrically connected to the first segment through coupling;
a projection of the second coupling end in the first plane at least partially overlaps the second segment; and
the second coupling end is also electrically connected to the second segment through coupling.

10. The feed stripline according to claim 2, wherein an included angle $\alpha$ between a projection of the connection segment in the first plane and the second power branch line meets a condition: $45° \leq \alpha \leq 90°$.

11. The feed stripline according to claim 2, wherein the first plane is parallel to the second plane.

12. The feed stripline according to claim 1, wherein the feed stripline further comprises:
a signal input port;
a first output port; and
a second output port, wherein:
one end of the signal input line is directed away from the first power branch line,
the second power branch line is connected to the signal input port, one end of the first power branch line directed away from the signal input line is connected to the first output port, and one end of the second power branch line directed away from the signal input line is connected to the second output port.

13. The feed stripline according to claim 1, wherein:

the feed stripline further comprises a shielding cavity, and the signal input line, the first power branch line, and the second power branch line are all accommodated in the shielding cavity, fastened in the shielding cavity, and insulated from the shielding cavity.

14. An apparatus, comprising:

a feed stripline comprising:

a signal input line;

a first power branch line; and a second power branch line, wherein:

a first end of the signal input line is configured to be conductively coupled to an external signal source, a second end of the signal input line is electrically connected to each of the first power branch line and the second power branch line, the first power branch line comprises a jump structure, the first power branch line spans across the second power branch line from a first side of the second power branch line to a second side of the second power branch line via the jump structure, and the jump structure and the second power branch line are spaced apart from each other.

15. The apparatus according to claim 14, wherein:

the apparatus is a phase shifter; and the apparatus further comprises a sliding medium, wherein the sliding medium separately overlaps the first power branch line or the second power branch line, and the sliding medium is configured to slide relative to the first power branch line or the second power branch line to adjust a phase of a signal output by the phase shifter.

16. The apparatus according to claim 15, wherein:

the feed stripline is configured as a power divider; and the sliding medium is configured to change electrical lengths of the first power branch line and the second power branch line by sliding relative to the feed stripline, to adjust a phase difference between an electrical signal transmitted in the first power branch line and an electrical signal transmitted in the second power branch line.

17. The apparatus according to claim 14, wherein the apparatus is a base station.

18. An array antenna, comprising:

a radiation array; and a phase shifter coupled to the radiation array, the phase shifter comprising a signal input line, a first power branch line, and a second power branch line, wherein:

a first end of the signal input line is configured to be conductively coupled to an external signal source, a second end of the signal input line is electrically connected to each of the first power branch line and the second power branch line, the first power branch line comprises a jump structure, the first power branch line spans across the second power branch line from a first side of the second power branch line to a second side of the second power branch line via the jump structure, and the jump structure and the second power branch line are spaced apart from each other.

19. The array antenna according to claim 18, wherein the phase shifter further comprises a sliding medium, wherein the sliding medium separately overlaps the first power branch line or the second power branch line, and the sliding medium is configured to slide relative to the first power branch line or the second power branch line to adjust a phase of a signal output by the phase shifter.

20. The array antenna according to claim 19, further comprising a combiner or a filter having a first port coupled to an output of the phase shifter and a second port configured to be coupled to an antenna interface.

* * * * *